(12) United States Patent
Ishida et al.

(10) Patent No.: US 10,671,004 B2
(45) Date of Patent: Jun. 2, 2020

(54) MOVABLE HOLDING DEVICE, OPERATION UNIT DISPLACEMENT DEVICE, AND IMAGE FORMING SYSTEM

(71) Applicant: FUJI XEROX CO., LTD., Tokyo (JP)

(72) Inventors: Mitsuyuki Ishida, Kanagawa (JP); Bokryong Lee, Kanagawa (JP); Hiroomi Arai, Kanagawa (JP); Jing Ma, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 16/290,150

(22) Filed: Mar. 1, 2019

(65) Prior Publication Data
US 2020/0081381 A1    Mar. 12, 2020

(30) Foreign Application Priority Data

Sep. 10, 2018 (JP) .................. 2018-169217
Sep. 10, 2018 (JP) .................. 2018-169218

(51) Int. Cl.
*G03G 15/00* (2006.01)
*G03G 21/16* (2006.01)
*F16M 11/12* (2006.01)

(52) U.S. Cl.
CPC ......... *G03G 15/5016* (2013.01); *F16M 11/12* (2013.01); *G03G 21/1647* (2013.01); *G03G 2215/00109* (2013.01)

(58) Field of Classification Search
CPC ................... G03G 15/5016; G03G 21/1647
See application file for complete search history.

(56) References Cited

U.S. PATENT DOCUMENTS

2009/0232537 A1* 9/2009 Ogasawara ........ G03G 15/5016
                                                            399/81
2015/0282347 A1* 10/2015 Maeda ................. H05K 5/0017
                                                           361/679.01
2018/0041649 A1* 2/2018 Koyanagi .......... G03G 21/1647

FOREIGN PATENT DOCUMENTS

| JP | 2006-347091 A | 12/2006 |
| JP | 2009-204639 A | 9/2009 |
| JP | 2012-189954 A | 10/2012 |
| JP | 6041929 B2 | 12/2016 |

* cited by examiner

*Primary Examiner* — Sandra Brase
(74) *Attorney, Agent, or Firm* — Oliff PLC

(57) ABSTRACT

A movable holding device includes: a base; an attachment unit to which an operation unit is to be attached; and a connecting unit that extends in a longitudinal direction, has recessed members forming a space with each other and being connected to each other so that a relative movement thereof changes a position of the attachment unit with respect to the base, and has one longitudinal end portion connected to the base and another longitudinal end portion connected to the attachment unit.

20 Claims, 16 Drawing Sheets

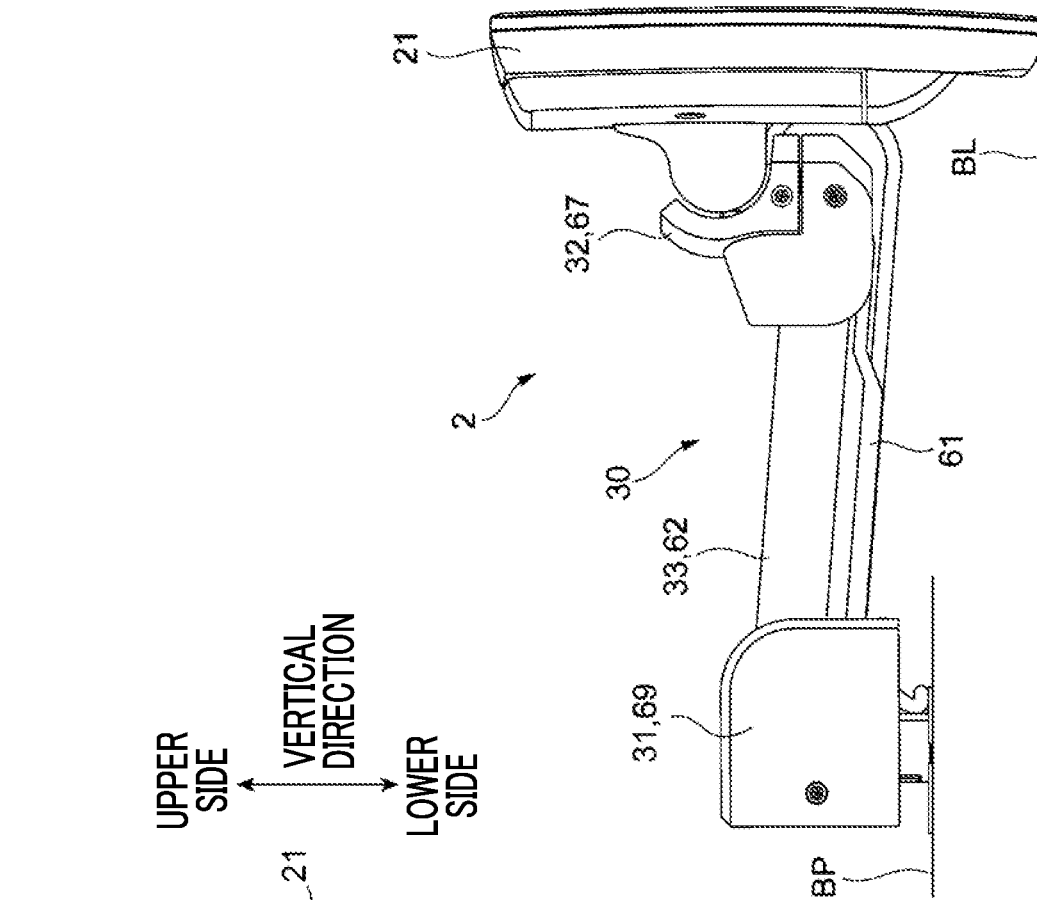
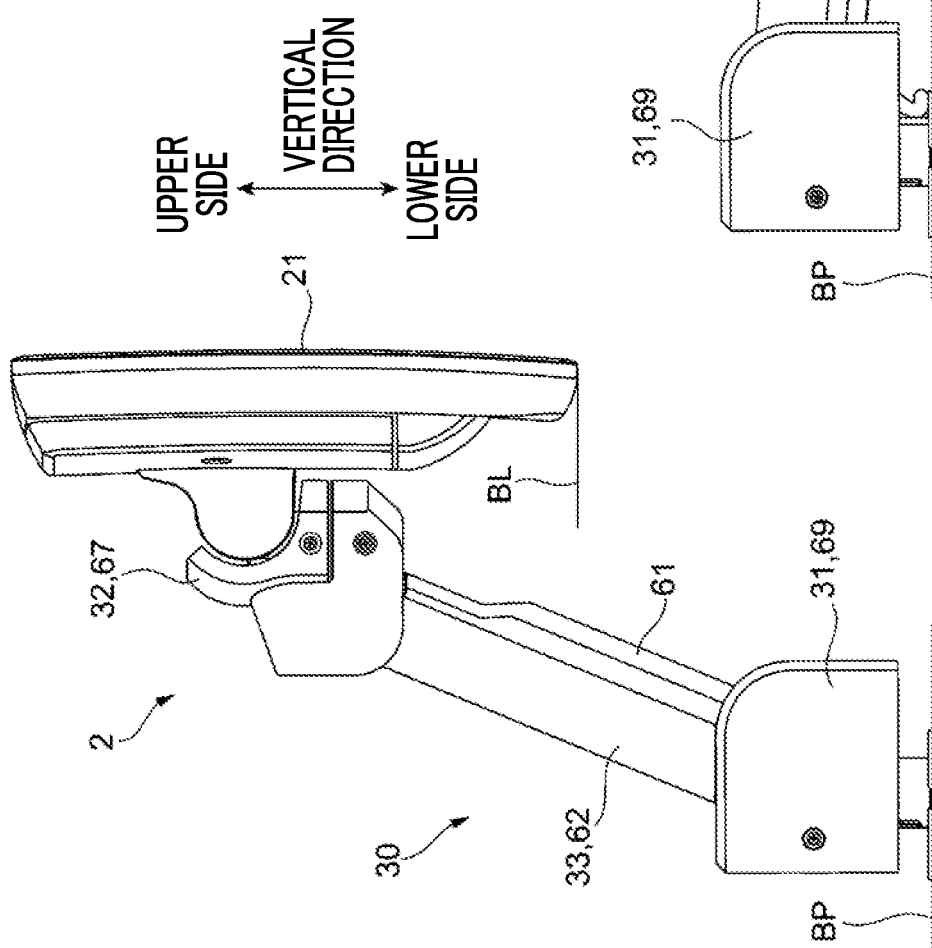

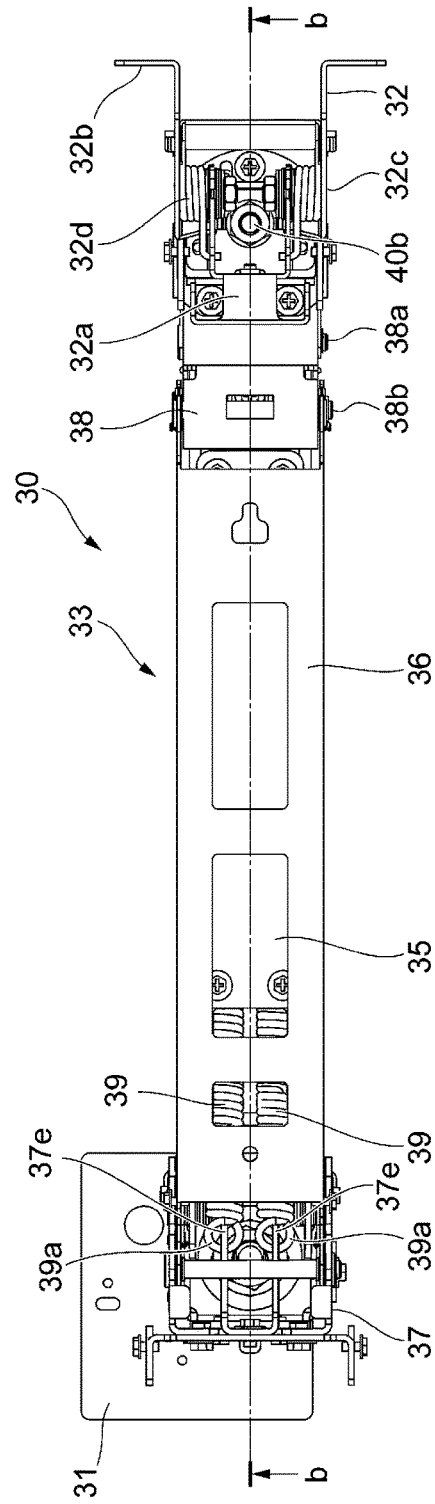
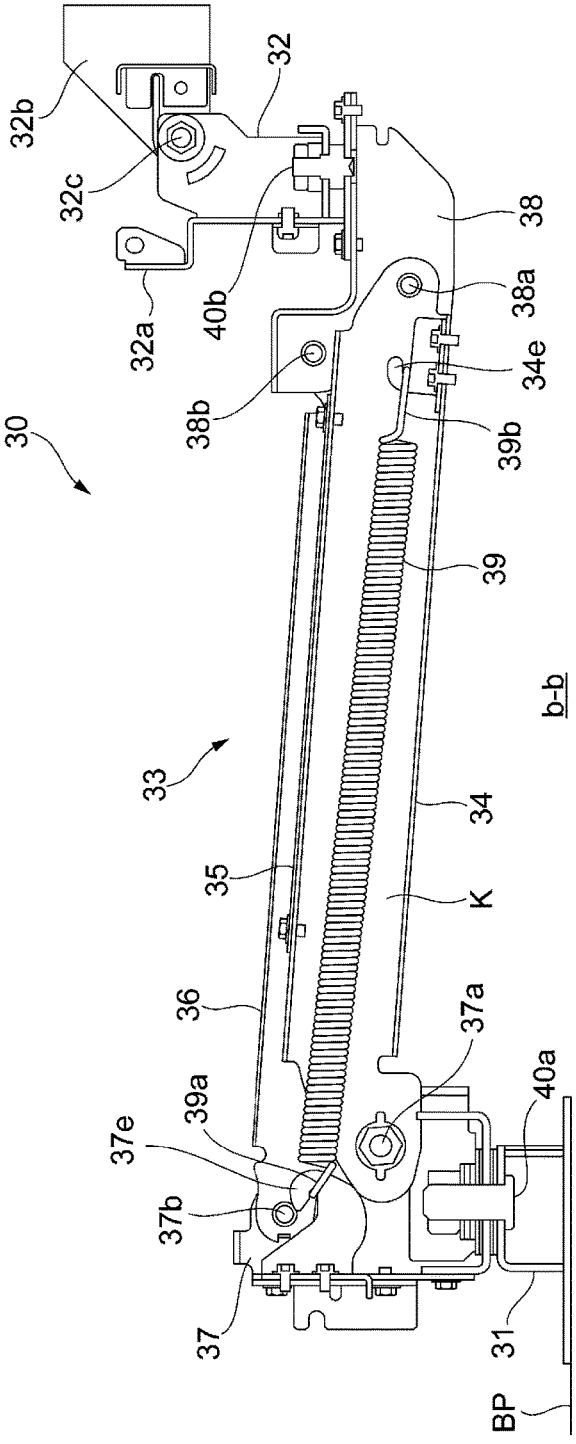

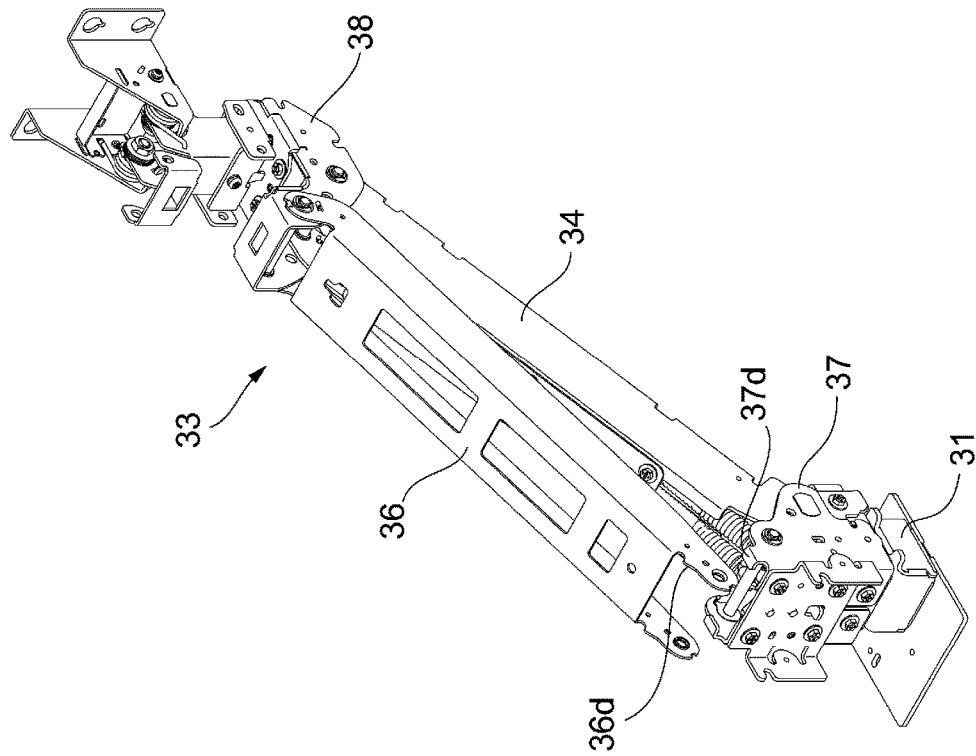
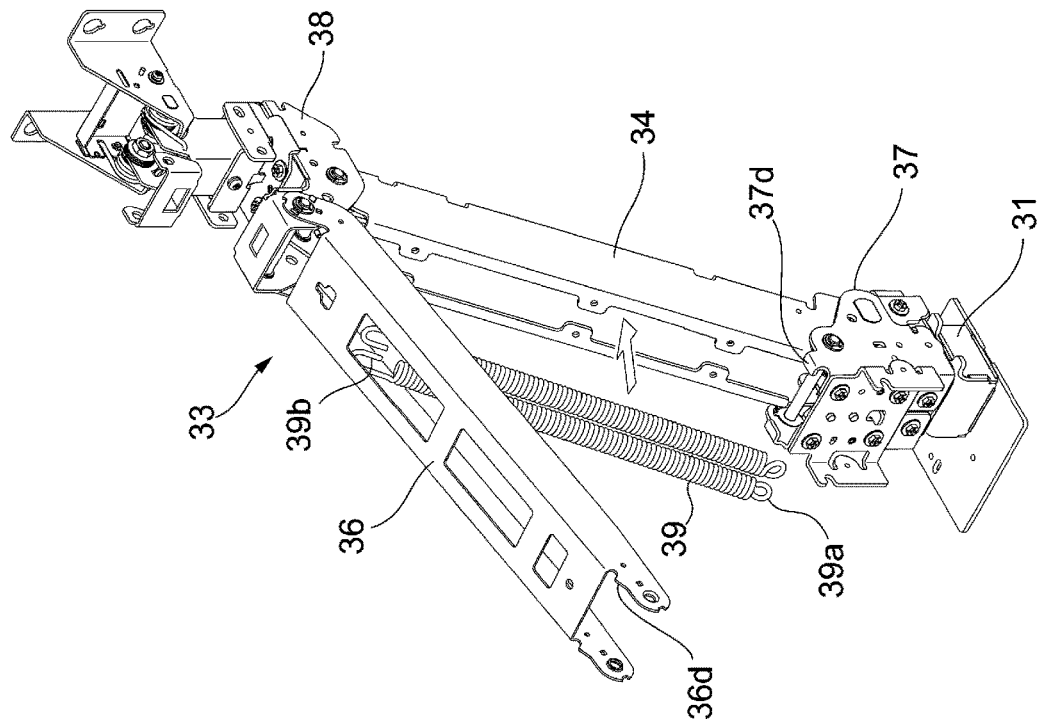

FIG. 13A
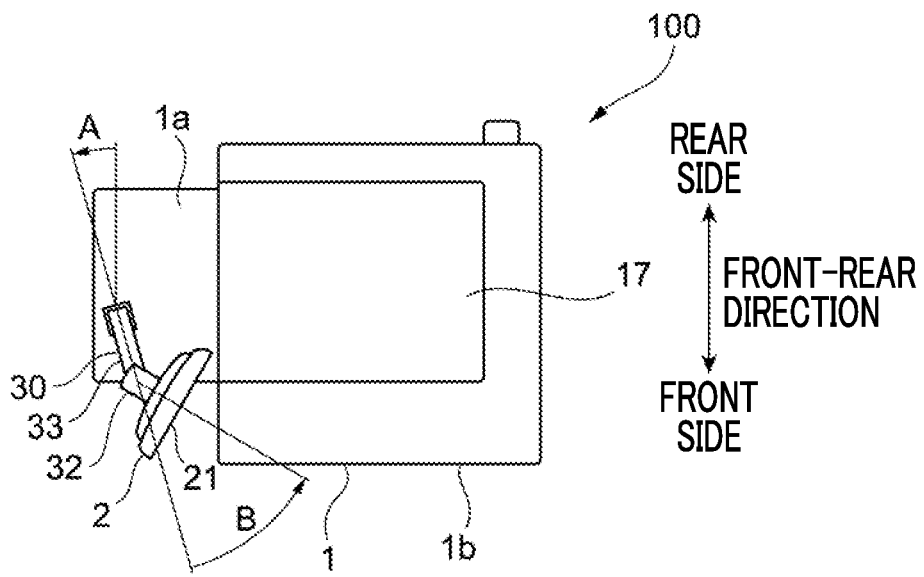
FIG. 13C
FIG. 13D
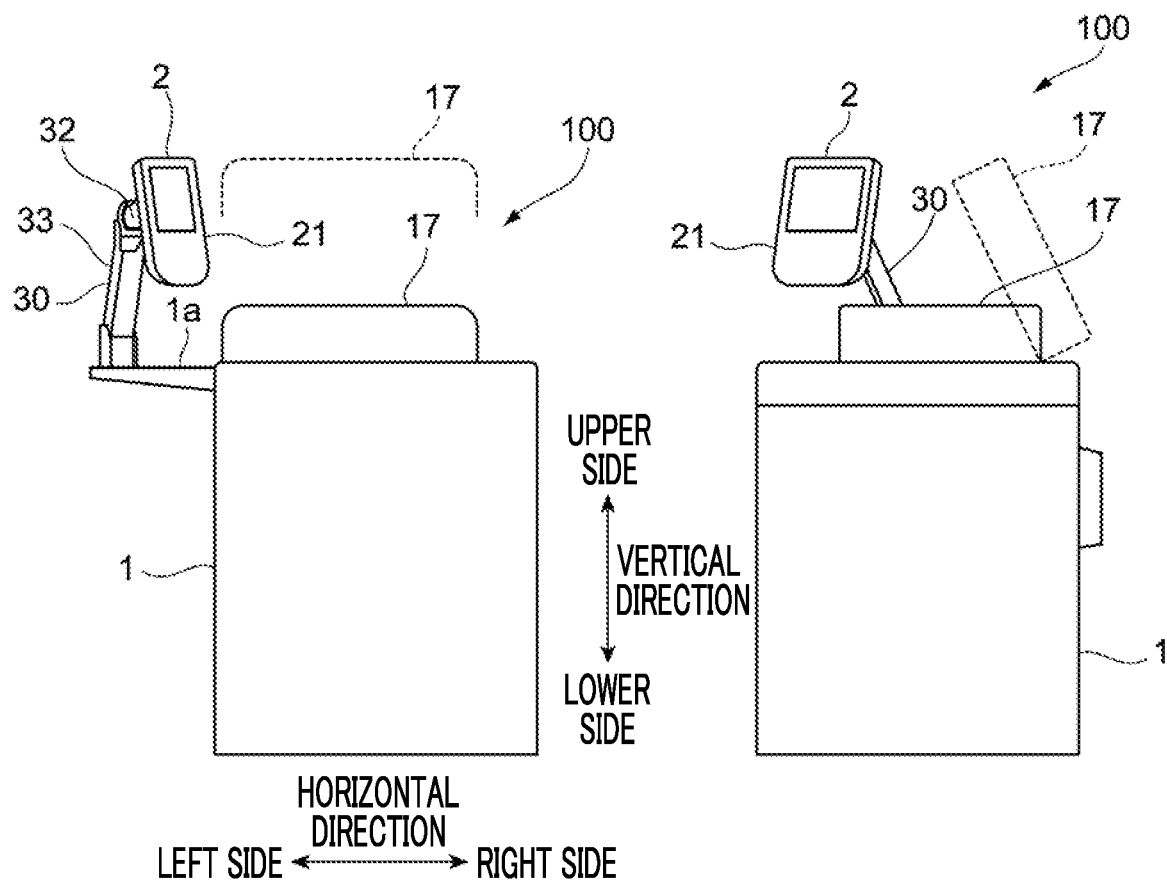

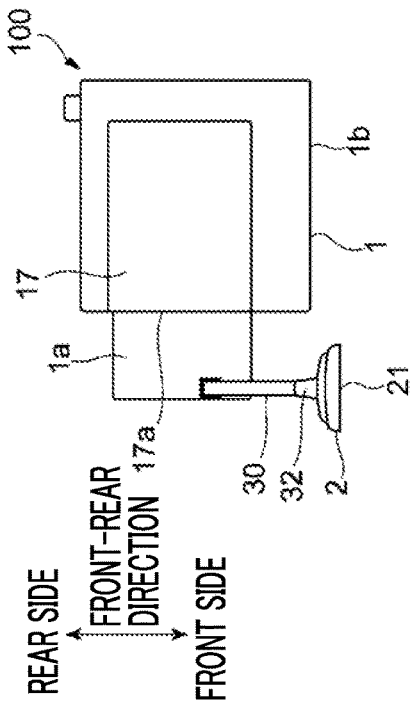
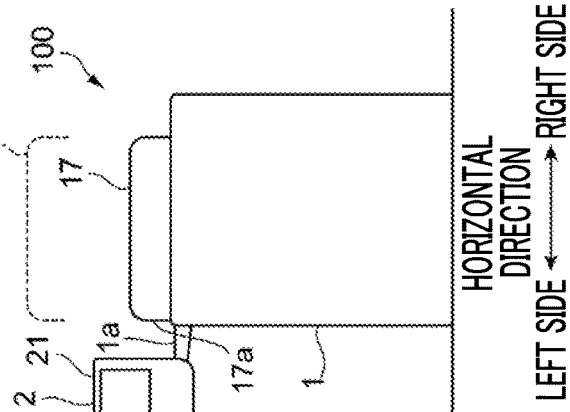
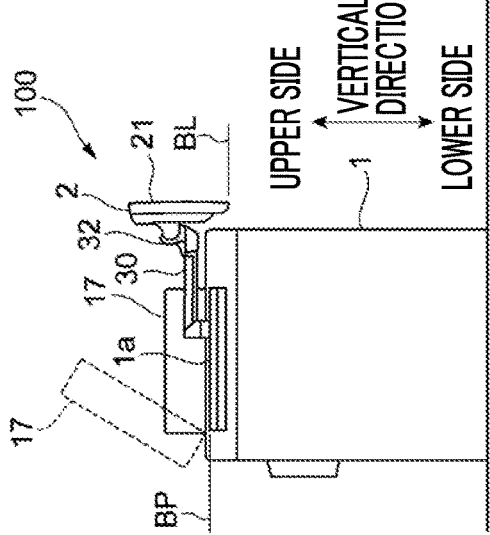

MOVABLE HOLDING DEVICE, OPERATION UNIT DISPLACEMENT DEVICE, AND IMAGE FORMING SYSTEM

CROSS-REFERENCE TO RELATED APPLICATIONS

This application is based on and claims priority under 35 USC 119 from Japanese Patent Application No. 2018-169217 filed Sep. 10, 2018 and Japanese Patent Application No. 2018-169218 filed Sep. 10, 2018.

BACKGROUND

(i) Technical Field

The present disclosure relates to a movable holding device, an operation unit displacement device, and an image forming system.

(ii) Related Art

JP 6041929 B discloses a rotating device including: a strut supported rotatably at an angle in a predetermined rotation range with respect to the device; an operating body that is fixed to the strut and receives a pressing operation; a load member for applying a frictional load to the strut when the strut rotates; and a biasing member for biasing the load member in the direction of increasing the frictional load.

JP 2006-347091 A discloses an image forming apparatus including an apparatus main body and an operation unit provided in the apparatus main body via a support member, in which the operation unit is movable between a use position at which at least a part thereof protrudes outward from an outer edge of the apparatus main body and a retracted position at which the entire operation unit is located inward from the outer edge at an upper portion of the apparatus main body.

When the operation unit operated by a user is displaceable, it is necessary to increase the rigidity of a connecting unit for connecting the operation unit.

If the operation unit is displaceable with respect to the apparatus that operates in response to an operation on the operation unit, the operation unit located in the movable range of a movable unit in the apparatus will interfere with the movement of the movable unit. However, such a movable range may differ depending on the type of the apparatus.

SUMMARY

Aspects of non-limiting embodiments of the present disclosure relate to increasing the rigidity of a connecting unit capable of changing the position of an operation unit as compared to the case where the present disclosure is not applied.

Aspects of non-limiting embodiments of the present disclosure also relate to setting the displacement of the operation unit within an allowable range with respect to the movable range of a movable unit.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a movable holding device including a base, an attachment unit to which an operation unit is to be attached, and a connecting unit that extends in a longitudinal direction, has recessed members forming a space with each other and being connected to each other so that a relative movement thereof changes a position of the attachment unit with respect to the base, and has one longitudinal end portion connected to the base and another longitudinal end portion connected to the attachment unit.

BRIEF DESCRIPTION OF THE DRAWINGS

Exemplary embodiments of the present disclosure will be described in detail based on the following figures, wherein:

FIGS. 2A and 2B are left side views illustrating an operation device, FIG. 2A illustrates a state where an operation unit is raised to a high position, and FIG. 2B illustrates a state where the operation unit is lowered to a low position;

FIGS. 4A and 4B are views illustrating the movable holding device in a fabricated state, FIG. 4A is a plan view, and FIG. 4B is a longitudinal cross-sectional view taken along line b-b of FIG. 4A;

FIG. 5A is a vertical cross-sectional view, and FIG. 5B is a perspective view;

FIGS. 7A and 7B illustrate the fabrication of the movable holding device in time series;

FIG. 11A shows views of a front and both sides of the operation unit illustrating a region and a direction of a load input, and FIG. 11B is a graph showing a measurement result;

FIG. 12A is a plan view of the image forming system, FIG. 12B is a left side view, and FIG. 12C is a front view;

FIGS. 13A, 13C, and 13D illustrate a position of the operation device with respect to the image forming apparatus, FIG. 13A is a plan view of the image forming system, FIG. 13C is a front view of the image forming system, and FIG. 13D is a right side view of the image forming system;

FIGS. 14A, 14B, and 14C illustrate a position of the operation device with respect to the image forming apparatus, FIG. 14A is a plan view of the image forming system, FIG. 14B is a left side view of the image forming system, and FIG. 14C is a front view of the image forming system;

DETAILED DESCRIPTION

Hereinafter, exemplary embodiments of the present disclosure will be described in detail with reference to the accompanying drawings.

Image Forming System 100

Figure 1:
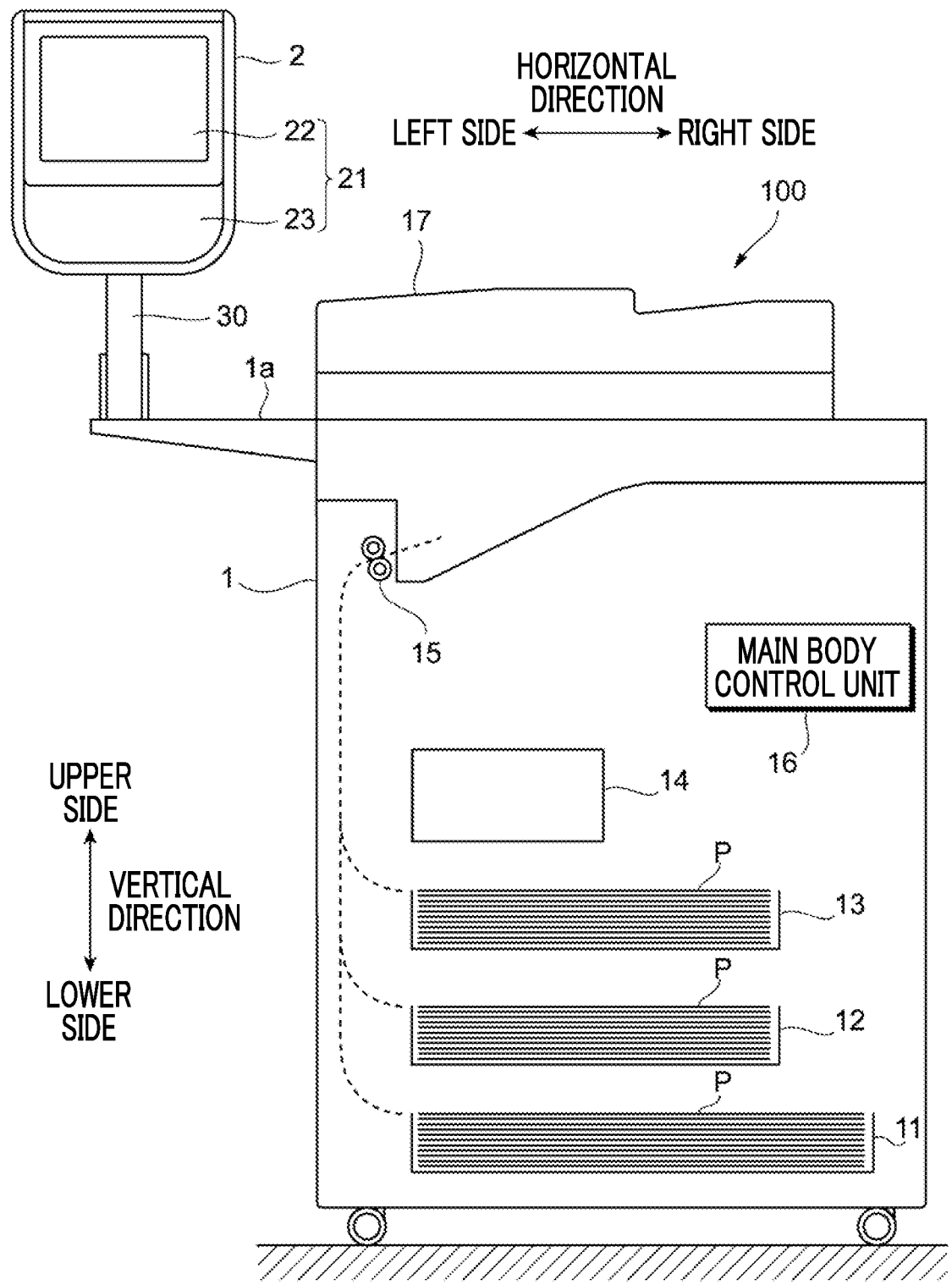
FIG. 1 is a diagram illustrating a configuration of an image forming system to which the present exemplary embodiment is applied.

FIG. 1 is a diagram illustrating a configuration of an image forming system 100 to which the present exemplary embodiment is applied. The image forming system 100 includes an image forming apparatus 1 for forming an image on a recording medium (sheet) such as a paper sheet P by using an electrophotographic method or the like, and an operation device 2 for operating the image forming apparatus 1. The image forming system 100 according to the present exemplary embodiment is an example of an image forming system.

Image Forming Apparatus 1

The image forming apparatus 1 includes sheet accommodating units 11, 12, and 13 for accommodating sheets P, an image forming unit 14 for forming an image on the sheet P, a discharge roller 15 for discharging the sheet P on which an image is formed, a main body control unit 16 for controlling an operation of the image forming apparatus 1, and a movable document feeding device 17 for sequentially feeding plural documents. The image forming unit 14 is an example of an image forming unit, and the sheet accommodating units 11, 12, and 13 are an example of a sheet feeding unit.

The sheet accommodating units 11, 12, and 13 accommodate the sheet P of different sizes and types. In the illustrated example, each of the sheet accommodating units 11, 12, and 13 can be pulled out in the direction upward from the plane of drawing, that is, to the front side in the width direction. Then, a user refills the sheet P in a state where the sheet accommodating unit 11, 12, and 13 is pulled out.

The image forming unit 14 forms an image on the sheet P transported from the sheet accommodating unit 11, 12, and 13. The image forming unit 14 in FIG. 1 forms an image on the sheet P by an electrophotographic method in which toner adhering to a photoconductor is transferred onto the sheet P to form an image, but the image forming unit 14 may form an image by an inkjet method in which ink is ejected onto the sheet P to form an image.

The discharge roller 15 discharges the sheet P on which an image is formed by the image forming unit 14. The discharge roller 15 in FIG. 1 is composed of a pair of rollers, and as the pair of rollers rotates, the sheet P is discharged from the image forming apparatus 1.

The main body control unit 16 controls an operation of each component provided in the image forming apparatus 1. The main body control unit 16 in FIG. 1 receives a signal indicating the content of an operation for the operation device 2.

The document feeding device 17 is a device for feeding a document one by one to a region for reading an image of a document, and is rotatable with respect to the main body of the image forming apparatus 1. The document feeding device 17 has a function as a document platen cover for covering the platen glass of the image forming apparatus 1, and opens and closes with respect to the platen glass.

The operation of the image forming apparatus 1 will be described. First, as an instruction signal is output from the main body control unit 16 in response to a signal from the operation device 2, the sheet P is fed one by one from the sheet accommodating units 11, 12, and 13. After the image is formed on the sheet P by the image forming unit 14, the sheet P on which the image is formed is discharged from the discharge roller 15.

Operation Device 2

The operation device 2 includes an operation unit 21 electrically connected to the image forming apparatus 1 to operate the image forming apparatus 1, and a movable holding device 30 movably attached to the image forming apparatus 1 and holding the operation unit 21.

The operation unit 21 includes a display unit 22 for displaying an image for operation, and an input unit 23 on which various buttons (not shown) for performing input in accordance with the operation image of the display unit 22 are arranged. Although the display unit 22 and the input unit 23 are separately provided in the present exemplary embodiment, a touch panel or the like having both functions may be employed.

Movable Holding Device 30 of Operation Device 2

FIGS. 2A and 2B are left side views illustrating the operation device 2, FIG. 2A illustrates a state where the operation unit 21 is raised to a high position and FIG. 2B illustrates a state where the operation unit 21 lowered to a low position. The positions of the operation unit 21 and a holding unit 32 in FIG. 2A may be referred to as the uppermost position, and the positions thereof in FIG. 2B may be referred to as the lowermost position.

As shown in FIGS. 2A and 2B, the movable holding device 30 of the operation device 2 includes a fixing portion 31 fixed to the image forming apparatus 1, the holding unit 32 holding the operation unit 21, and a connecting unit 33 connecting the fixing portion 31 and the holding unit 32 to each other.

FIGS. 2A and 2B show an external appearance of the movable holding device 30 in a state in which various covers 61 and the like are attached thereto. Therefore, FIGS. 2A and 2B show the position of the fixing portion 31 covered by the cover 69 or the like. In addition, the positions of the holding unit 32 covered by the cover 67 and the like and the connecting unit 33 covered by the covers 61 and 62 are shown. The cover 61 and the like will be described later.

The connecting unit 33 shown in FIGS. 2A and 2B is rotatable about an axis extending in a sheet vertical direction with respect to the fixing portion 31, and rotates in accordance with the position (level) of the operation unit 21 in the vertical direction.

As shown in FIG. 2A, when the operation unit 21 is raised, the connecting unit 33 rotates to move upward (in a longitudinal direction). Further, as shown in FIG. 2B, when the operation unit 21 is lowered, the connecting unit 33 rotates to move in the lateral direction. When the operation unit 21 is lowered, a lower end portion BL of the operation unit 21 is located below a mounting surface BP (see FIG. 1) of a mounting plate 1a for mounting the operation unit 21. As shown in FIGS. 2A and 2B, the position of the operation unit 21 attached to the holding unit 32 is not the center of the operation unit 21 in the vertical direction, but the position upper than the center thereof. Therefore, the lower end portion BL of the operation unit 21 can be lowered to a low position, and the lower end portion BL can be located below the mounting surface BP.

Figure 3:
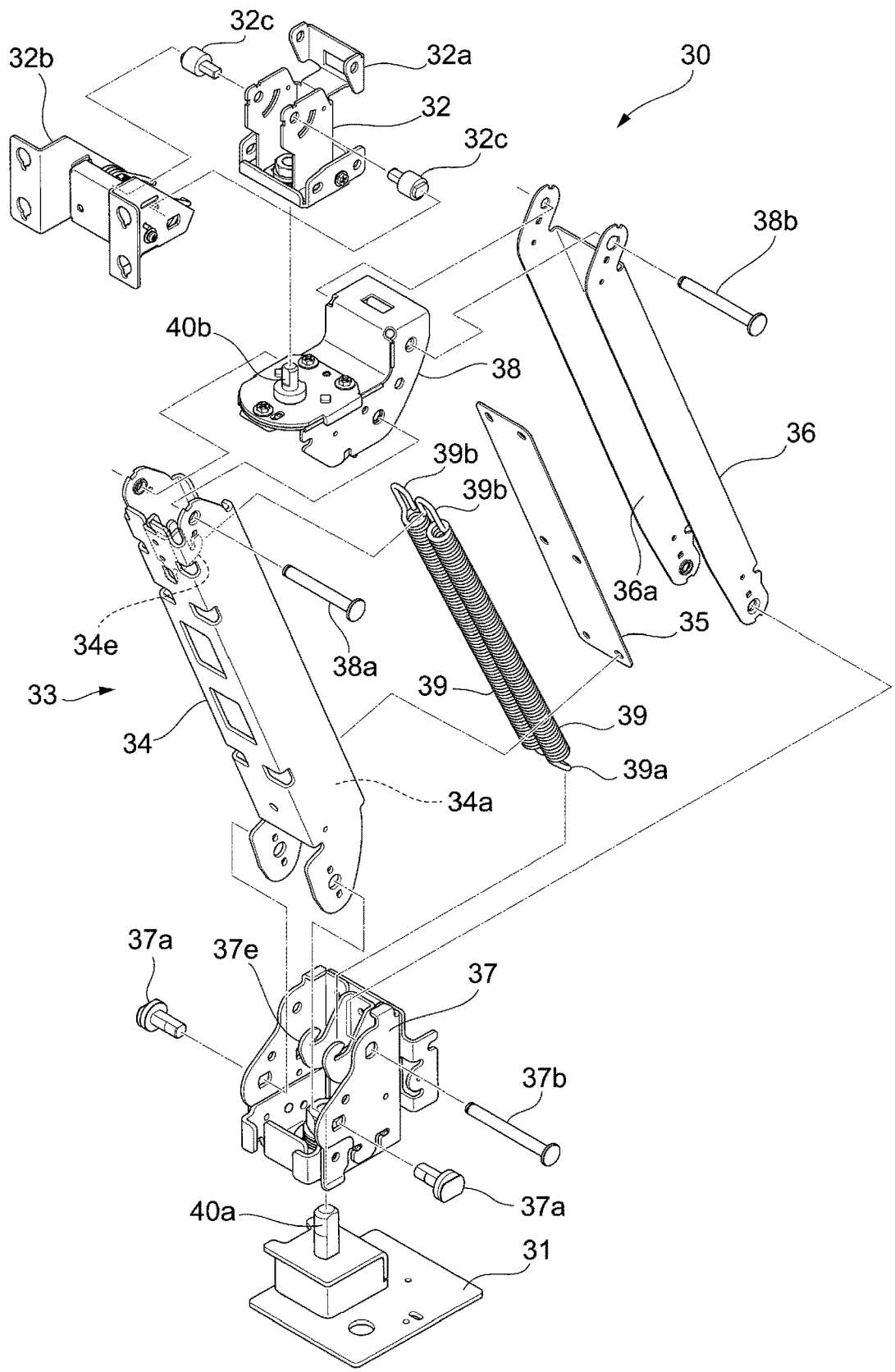
FIG. 3 is an exploded perspective view of a movable holding device.

FIG. 3 is an exploded perspective view of the movable holding device 30, and various covers 61 and the like are not shown. FIGS. 4A and 4B are views illustrating the movable holding device 30 in a fabricated state, FIG. 4A is a plan view, and FIG. 4B is a longitudinal cross-sectional view taken along line b-b of FIG. 4A. FIGS. 4A and 4B show the case where the holding unit 32 is at the lowest position.

As shown in FIG. 3 or FIGS. 4A and 4B, the movable holding device 30 includes a lower side member 34 and an upper side member 36 that form a part of the connecting unit 33. The relative movement of the lower side member 34 and the upper side member 36 of the connecting unit 33 changes the position of the holding unit 32 with respect to the fixing portion 31.

Each of the lower side member 34 and the upper side member 36 is a U-shaped longitudinal member formed of sheet metal and opened in the longitudinal direction in the cross section. The lower side member 34 has a U-shaped recess 34a, and the upper side member 36 has a U-shaped recess 36a. The lower side member 34 is longitudinally opened on an upper side and the upper side member 36 is longitudinally opened on a lower side. The lower side member 34 and the upper side member 36 are apart from each other.

In the present exemplary embodiment, the rigidity of the connecting unit 33 is increased by attaching a flat plate 35 to the lower side member 34 so as to cover the opened surface of the lower side member 34. Plural cutout portions for reducing weight are formed in the upper side member 36 (see, FIG. 4A).

The connecting unit 33 includes the lower side member 34, the flat plate 35, and the upper side member 36, and also includes a lower end member 37 that supports one end of each of the lower side member 34 and the upper side member 36 so that the lower side member 34 and the upper side member 36 are rotatable about rotation shafts 37a and 37b. The connecting unit 33 includes an upper end member 38 that supports the other end of each of the lower side member 34 and the upper side member 36 so that the lower side member 34 and the upper side member 36 are rotatable about rotation shafts 38a and 38b. The lower end member 37 of the connecting unit 33 is connected to the fixing portion 31, and the upper end member 38 is connected to the holding unit 32.

The rotation shafts 37a and 37b of the lower end member 37 and the rotation shafts 38a and 38b of the upper end member 38 extend along the mounting surface BP (see, FIG. 2).

The lower side member 34 and the upper side member 36 are connected to the lower end member 37 and to the upper end member 38 at different positions. The members 34, and 36 to 38 form a parallel link. As the lower side member 34 and the upper side member 36 rotate with respect to the lower end member 37, the separation distance between the lower side member 34 and the upper side member 36 changes.

In this exemplary embodiment, the separation distance between the lower side member 34 and the upper side member 36 is reduced when the holding unit 32 is at the highest position (uppermost position, see FIG. 2A) and at the lowest position (lowermost position, see FIG. 2B), and is increased at the middle position. That is, when the holding unit 32 is moved from the uppermost position to the lowermost position, the lower side member 34 and the upper side member 36 adjacent to each other are gradually separated, for example, both are most distant from each other at a substantially central position, and then gradually approach as the lower side member 34 and the upper side member 36 move to the lowermost position. Thus, an internal space between the lower side member 34 and the upper side member 36 is in a so-called collapsed state at the uppermost position and lowermost position where the lower side member 34 and the upper side member 36 approach each other and is in a widened state at an intermediate position. By adopting the structure that the internal space expands at the intermediate position, it is possible to reduce the outer dimension of the connecting unit 33 as compared with a case where the structure that the internal space expands at the uppermost position or the lowermost position is adopted.

As shown in FIGS. 4A and 4B, the lower side member 34 and the upper side member 36 are located to overlap each other. Specifically, the lower side member 34 is assembled and inserted into the upper side member 36. An internal space K is formed between the recess 34a of the lower side member 34 and the recess 36a of the upper side member 36.

In the internal space K between the lower side member 34 and the upper side member 36, two tension coil springs 39 that generate a biasing force to return to the original state in accordance with the tension force are arranged side by side. Of hooks 39a and 39b at both ends of the tension coil spring 39, one hook 39a is engaged with a hook portion 37e of the lower end member 37, and the other hook 39b is engaged with a hook portion 34e of the lower side member 34.

The connecting unit 33 of the movable holding device 30 has a hole for receiving a rotation shaft 40a (see, FIG. 3) of the fixing portion 31, and a rotation shaft 40b (see, FIG. 3) for allowing the holding unit 32 to rotate with respect to the connecting unit 33.

Each of the rotation shafts 40a and 40b extends in the vertical direction. Therefore, it is possible to largely secure an angle of the operation unit 21 held by the holding unit 32 to be directed in the horizontal direction by rotation around the rotation shaft 40a and rotation around the rotation shaft 40b. In addition, the degree of freedom of the direction of the operation unit 21 can be increased by separately using the rotation around the rotation shaft 40a and the rotation around the rotation shaft 40b.

The holding unit 32 of the movable holding device 30 has an upper end member side member 32a connected to the upper end member 38 of the connecting unit 33, an operation unit side member 32b connected to the operation unit 21 (for example, FIG. 2), and a rotation shaft 32c rotatably connecting the upper end member side member 32a and the operation unit side member 32b. The rotation shaft 32c extends in the same direction as the above-described rotation shafts 37a, 37b, 38a, and 38b. The holding unit 32 has a torsion coil spring 32d (see, FIG. 4A) provided on the rotation shaft 32c.

In this exemplary embodiment, the tension coil spring 39 is employed to bias the upper end member 38 so as to maintain the position thereof with respect to the lower end member 37 in the vertical direction, but a member other than the tension coil spring 39, such as an air cylinder, may be used.

The upper end member 38 is connected to the holding unit 32, and the lower end member 37 is connected to the fixing portion 31 via the rotation shaft 40a extending in the vertical direction. Therefore, it can be said that the tension coil spring 39 is for maintaining the level of the holding unit 32 from the fixing portion 31.

The tension coil spring 39 applies a biasing force to the lower end member 37 of the connecting unit 33.

The movable holding device 30 is an example of a movable holding device. The fixing portion 31 is an example of a base, and the holding unit 32 is an example of an attachment unit.

The connecting unit 33 is an example of a connecting unit, the lower end member 37 is an example of one end portion, the upper end member 38 is an example of the other end portion, the lower side member 34 and the upper side member 36 are examples of members, and the recesses 34*a* and 36*a* are examples of recesses. The tension coil spring 39 is an example of a biasing member, and is an example of a spring member. The internal space K is an example of space.

The operation device 2 is an example of an operation unit displacement device. The operation unit 21 is an example of an operation unit. The movable holding device 30 is an example of a displacement unit, the operation unit side member 32*b* of the holding unit 32 is an example of an attachment unit, and the fixing portion 31, the holding unit 32, the lower end member 37, and the upper end member 38 are an example of a joint. The image forming apparatus 1 is an example of an apparatus that operates in response to an operation on an operation unit, and the document feeding device 17 is an example of a movable unit that is movable on the device, and is an example of an opening and closing member.

Here, as described above, the movable holding device 30 can displace the holding unit 32 by rotation. That is, the connecting unit 33 can rotate about the rotation shaft 40*a* with respect to the fixing portion 31, and the lower side member 34 and the upper side member 36 of the connecting unit 33 can rotate about the rotation shafts 37*a* and 37*b* with respect to the lower end member 37. In addition, the upper end member 38 can rotate about the rotation shaft 40*b* with respect to the connecting unit 33, and the operation unit side member 32*b* can rotate about the rotation shaft 32*c* with respect to the upper end member side member 32*a*. Thus, the movable holding device 30 has a joint that displaces the operation unit 21 (for example, FIG. 2) held by the holding unit 32 of the movable holding device 30 by rotation. Herein, the joint is a joint that connects members and allows one member to rotate with respect to the other member.

When it comes to such a rotation of the joint, the movable range of the joint is set within a range in which the displacement of the operation unit 21 is allowed with respect to the movable range of the document feeding device 17 (see, FIG. 1) of the image forming apparatus 1. The movable range of the document feeding device 17 is an example of a first movable range, and the movable range of the joint is an example of a second movable range.

Figure 5A:
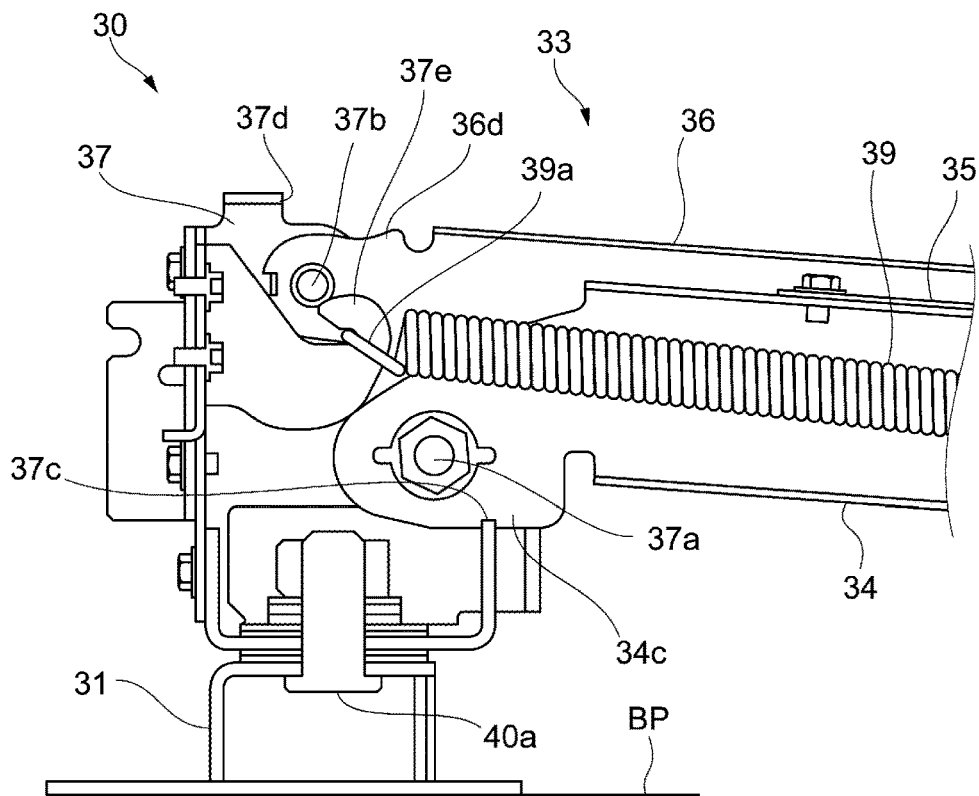
FIGS. 5A and 5B are views illustrating a structure for defining the movable range of a connecting unit with respect to a fixing portion.
Figure 5B:
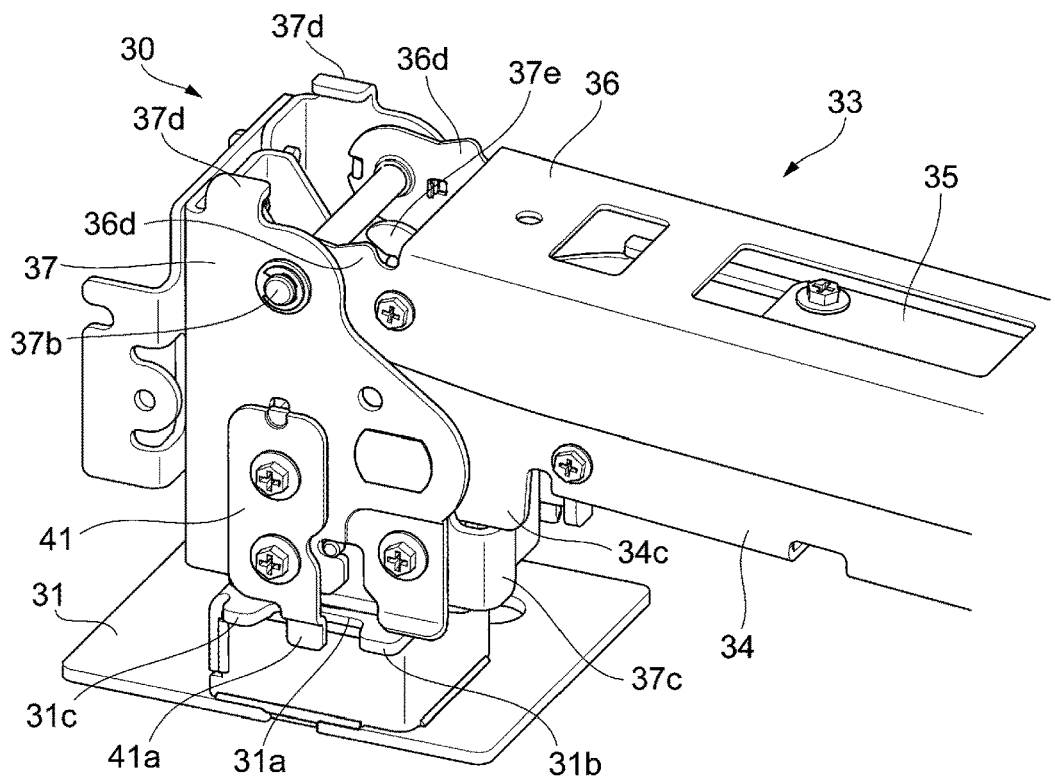

FIGS. 5A and 5B are views illustrating a structure for defining the movable range of the connecting unit 33 with respect to the fixing portion 31, FIG. 5A is a vertical cross-sectional view and FIG. 5B is a perspective view. FIGS. 5A and 5B show a case where the holding unit 32 is at the lowest.

The connecting unit 33 can rotate about the rotation shafts 37*a* and 37*b* and rotate about the rotation shaft 40*a* with respect to the fixing portion 31. After describing the structure for defining the movable range (movable range in the height direction) by rotation about the rotation shafts 37*a* and 37*b* with reference to FIG. 5A, the structure for defining the movable range by rotation around the rotation shaft 40*a* will be described with reference to FIG. 5B.

As shown in FIG. 5A, the lower end member 37 of the connecting unit 33 has an abutment portion 37*c* that abuts a portion 34*c* of the lower side member 34 and an abutment portion 37*d* that abuts a portion 36*d* of the upper side member 36. FIG. 5A shows a state in which the portion 34*c* of the lower side member 34 abuts against the abutment portion 37*c* of the lower end member 37, and a state in which the portion 36*d* of the upper side member 36 does not abut against the abutment portion 37*d* of the lower end member 37.

Thus, in the rotation about the rotation shafts 37*a* and 37*b*, the lower end member 37 defines one rotational end of the lower side member 34 by the abutment portion 37*c* and the other rotational end of the upper side member 36 by the abutment portion 37*d*.

As shown in FIG. 5B, the fixing portion 31 has a fixing side regulating member 31*a* on which projections 31*b* and 31*c* separated from each other are formed. To the lower end member 37 of the connecting unit 33, a rotation side regulating unit 41 that rotates about the rotation shaft 40*a* together with the lower end member 37 is detachably attached. The rotation side regulating unit 41 has an abutment portion 41*a* that abuts against the projections 31*b* and 31*c*. FIG. 5B shows a state in which the abutment portion 41*a* of the rotation side regulating unit 41 does not abut against any of the projections 31*b* and 31*c*.

Thus, in the rotation about the rotation shaft 40*a*, the rotation side regulating unit 41 defines the limit of rotation by abutting the abutment portions 41*a* located between the projections 31*b* and 31*c* to any of the projections 31*b* and 31*c*. By the engagement of the abutment portion 41*a* of the rotation side regulating unit 41 and the projections 31*b* and 31*c*, a range in which rotation about the rotation shaft 40*a* is allowed is set.

Although the rotation side regulating unit 41 is screwed to the lower end member 37 of the connecting unit 33, the rotation side regulating unit 41 may be engageable with the lower end member 37 before screwing. By the engagement, the workability in a case where the rotation side regulating unit 41 is attached to the lower end member 37 is improved. In the present exemplary embodiment, as will be described later, a configuration in which the rotation side regulating unit 41 is capable of being engaged with the lower end member 37 is adopted.

The rotation side regulating unit 41 is an example of a first member, and the abutment portion 41*a* is an example of a portion located between two projections. The fixing side regulating member 31*a* is an example of a second member, and the projections 31*b* and 31*c* are an example of two projections.

By adopting a configuration in which the rotation side regulating unit 41 is detachable as in the present exemplary embodiment, it is possible to change the limit of rotation about the rotation shaft 40*a*. For example, the position of the limit of rotation can be changed by replacing the rotation side regulating unit 41 with another rotation side regulating unit 41 having a different position with respect to the projections 31*b* and 31*c* of the abutment portion 41*a*. Further, the range of rotation about the rotation shaft 40*a* is increased by replacing the rotation side regulating unit 41 with another rotation side regulating unit 41 having a narrow abutment portion 41*a*, and conversely, the range of rotation is reduced when the rotation side regulating unit 41 is replaced with another rotation side restricting unit 41 having a wide abutment portion 41*a*.

It is possible to cut the cost by configuring the rotation side regulating unit 41 to be detachable, thereby setting the movable holding device 30 to be a part common to the image forming apparatus 1 instead of a part dedicated to the image forming apparatus 1, and by configuring the rotation side regulating unit 41 to be a part dedicated to the image forming apparatus 1. When the movable range of the operation unit 21 with respect to the image forming apparatus 1 differs depending on a model, a dedicated rotation side regulating unit 41 for each model is provided so as to cover not only a case where the image forming system 100 in which the operation device 2 is attached to the image forming apparatus 1 is shipped, but also a case where the operation device 2 is additionally delivered to a customer after the image forming apparatus 1 is delivered.

The term "detachable" herein means that the rotation side regulating unit 41 can be detached or attached without separating the movable holding device 30 from the image forming apparatus 1. For example, the term "detachable" also means that the rotation side regulating unit 41 can be detachably attached in a state where the fixing portion 31 is attached to the image forming apparatus 1, and the rotation side regulating unit 41 can be detachably attached in a state where the connecting unit 33 is connected to the fixing portion 31. Moreover, the term "detachable" means a case in which the rotation side regulating unit 41 can be detachably attached in a state in which the cover 69 (FIGS. 2A and 2B or 10B) among various covers covering the movable holding device 30 is detached. The position at which the connecting unit 33 is mounted on the rotation shaft 40a is an example of the mounting position.

In the present exemplary embodiment, a configuration in which the limit of rotation about the rotation shaft 40a is changed, and a configuration in which the limit of rotation about the rotation shafts 37a and 37b is not changed are employed, but a configuration in which the limit of rotation about the rotation shafts 37a and 37b can be changed may also be employed.

The detachable configuration may be applied to any one or both of the rotation side regulating unit 41 and the fixing side regulating member 31a.

In the present exemplary embodiment, a configuration in which the limit of rotation about the rotation shaft 40a is changed, and a configuration in which the limit of rotation about the rotation shafts 37b and 37c is not changed are employed, but a configuration in which the limit of rotation about the rotation shafts 37b and 37c can be changed may also be employed.

In addition, in the present exemplary embodiment, two projections 31b and 31c that are separated from each other are formed on the fixing side regulating member 31a, and an abutment portion 41a that engages with the projections 31b and 31c is formed on the rotation side regulating unit 41. On the other hand, two projections (not shown) that are separated from each other may be formed on the rotation side regulating unit 41, and an abutment portion (not shown) that engages with the projections 31b and 31c may be formed on the fixing side regulating member 31a.

In addition, in the present exemplary embodiment, although a configuration is employed where two projections 31b and 31c that are separated from each other are formed on the fixing side regulating member 31a, and an abutment portion 41a located between the two projections 31b and 31c is formed on the rotation side regulating unit 41, the present disclosure is not limited thereto. For example, an arc-shaped groove (not shown) may be formed in the fixing side regulating member 31a, and a pin (not shown) moving in the groove may be formed in the rotation side regulating unit 41 so that both ends of the groove become rotation ends.

Fabrication of Movable Holding Device 30

Next, the fabrication of the movable holding device 30 will be described.

FIGS. 6A to 10B are diagrams for illustrating the fabrication of the movable holding device 30, and are shown in an order of A and B in each drawing in time series.

Figure 6A:
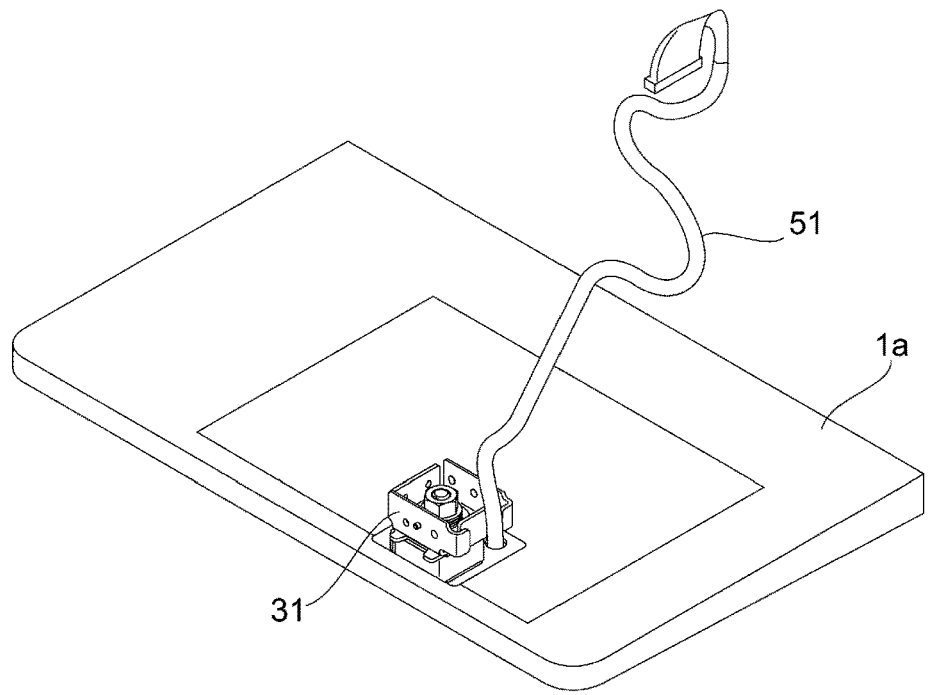
FIGS. 6A and 6B illustrate the fabrication of the movable holding device in time series.
Figure 6B:
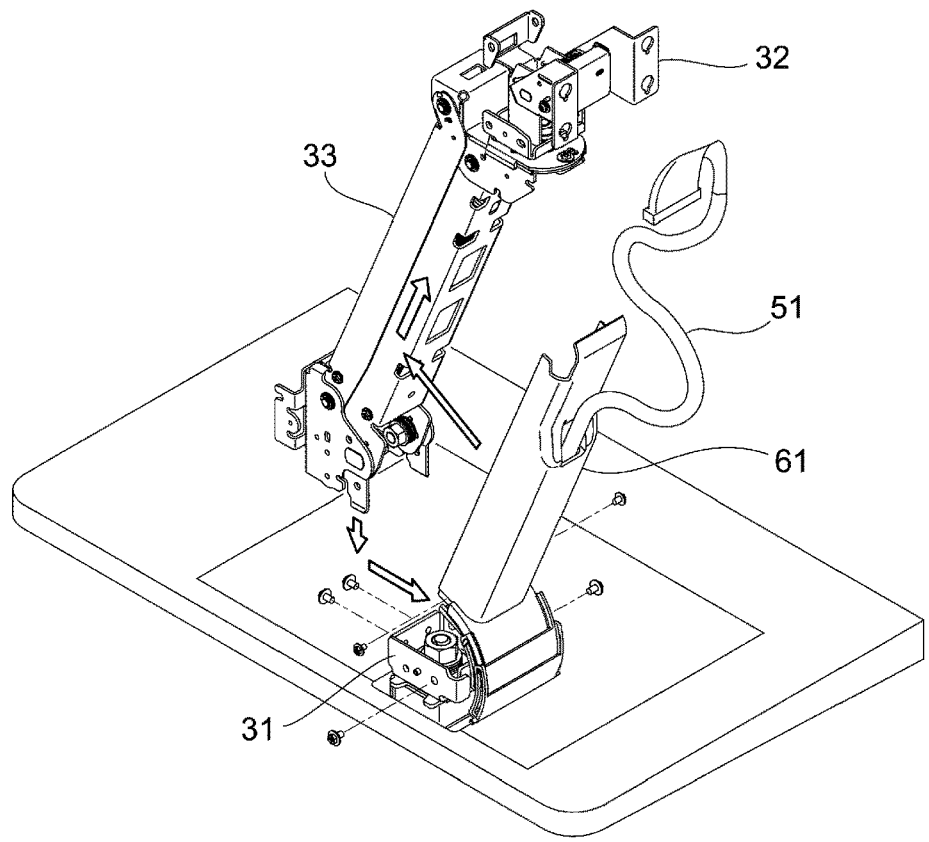

As shown in FIG. 6A, first, the fixing portion 31 is mounted on the mounting plate 1a of the image forming apparatus 1. In addition, a harness 51 including a communication cable connected to the image forming apparatus 1 for transmitting an operation signal is provided on the upper side of the mounting plate 1a. Then, as shown in FIG. 6B, the connecting unit 33 to which the holding unit 32 is attached is connected to the fixing portion 31, and the harness 51 is extended in the direction of the holding unit 32 through the cover 61. The cover 61 holds the harness 51 and covers the lower side of the connecting unit 33, and is screwed and attached to the connecting unit 33. As a result, it is possible to prevent the harness 51 from becoming entangled with the rotation of the movable holding device 30.

Here, a procedure for attaching the tension coil spring 39 to the connecting unit 33 will be described.

As shown in FIG. 7A, in the connecting unit 33, the upper side member 36 is detached from the lower end member 37 in a state in which the lower side member 34 is connected to the lower end member 37 and the upper end member 38. The upper side member 36 is not connected to the lower end member 37, but is connected to the upper end member 38. In the state shown in FIG. 7A, even if the lower side member 34 is rotated upward, the portion 36d of the upper side member 36 does not come into contact with the abutment portion 37d of the lower end member 37. Therefore, the upper side member 36 can be rotated upwardly beyond the limit of rotation when the upper side member 36 is connected to the lower end member 37.

As shown in FIG. 7A, when the lower side member 34 is in the upright state and the upper end member 38 is located at the high position, the distance between the hook portion 37e (for example, see FIG. 4B) of the lower end member 37 and the hook portion 34e (for example, see FIG. 4B) of the lower side member 34 becomes short to approach the free length of the tension coil spring 39. Therefore, the workability when attaching the hooks 39a and 39b of the tension coil spring 39 to the hook portions 37e and 34e (see, FIG. 4B) is improved.

After attachment of the tension coil spring 39, as shown in FIG. 7B, when the lower side member 34 is oriented sideways and the upper end member 38 is at the lowered position, the upper side member 36 does not interfere with the abutment portion 37d of the lower end member 37, and the upper side member 36 can be connected to the lower end member 37.

Thus, when the tension coil spring 39 is attached to the connecting unit 33, the tension coil spring 39 is hooked to the lower side member 34 and the lower end member 37 with the upper side member 36 detached from the lower end member 37 and the lower side member 34 attached to the lower end member 37, and then the upper side member 36 is attached to the lower end member 37.

The specification and the attachment position of the tension coil spring 39 are set in accordance with the weight of the operation unit 21.

In the present exemplary embodiment, the tension coil spring 39 in the attached state becomes elongated as it moves away from the uppermost position, and a stronger biasing force is generated. Further, the tension coil spring 39 is loaded in the lengthening direction by the weight of the operation unit 21.

In the rotation about the rotation shafts 37a and 37b, the biasing force of the tension coil spring 39 acts on the section between the limit of rotation in the upward direction and the limit of rotation in the downward direction, and the biasing force of the tension coil spring 39 is balanced with the weight of the operation unit 21. Accordingly, the operation unit 21 can be stopped at a height that is operable by a user.

Figure 8A:
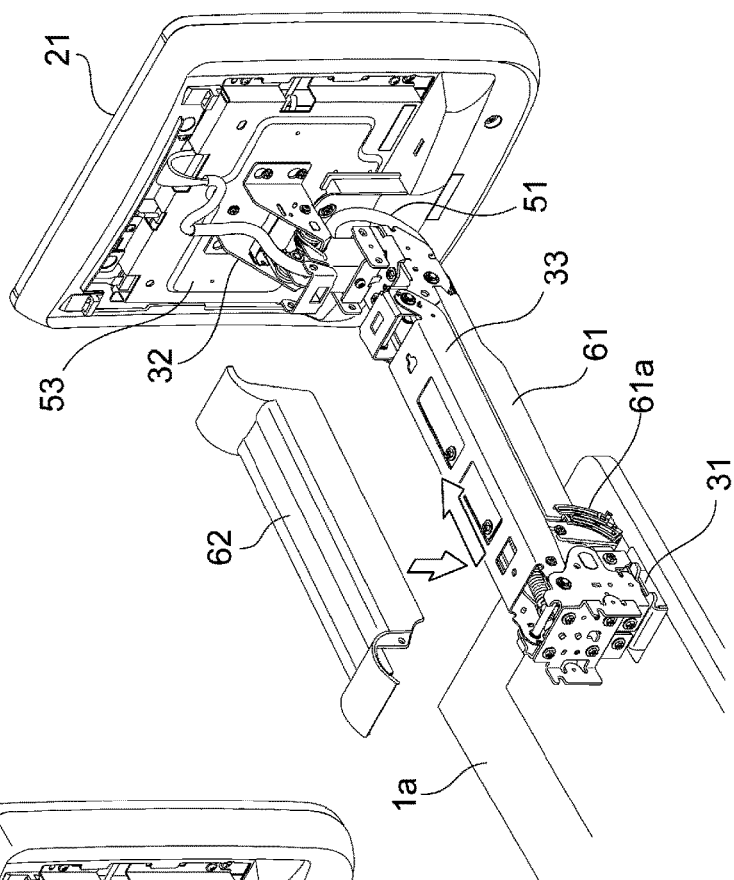
FIGS. 8A and 8B illustrate the fabrication of the movable holding device in time series.

As shown in FIG. 8A, the operation unit 21 is attached to the holding unit 32. That is, an attachment bracket 53 is attached in advance to a rear surface of the operation unit 21, and the holding unit 32 is screwed to the attachment bracket 53.

In addition, an accommodation member 52 for partially accommodating the harness 51 passing through the inside of the holding unit 32 is provided in the holding unit 32. Further, a connector of the harness 51 is connected to the operation unit 21.

Figure 8B:
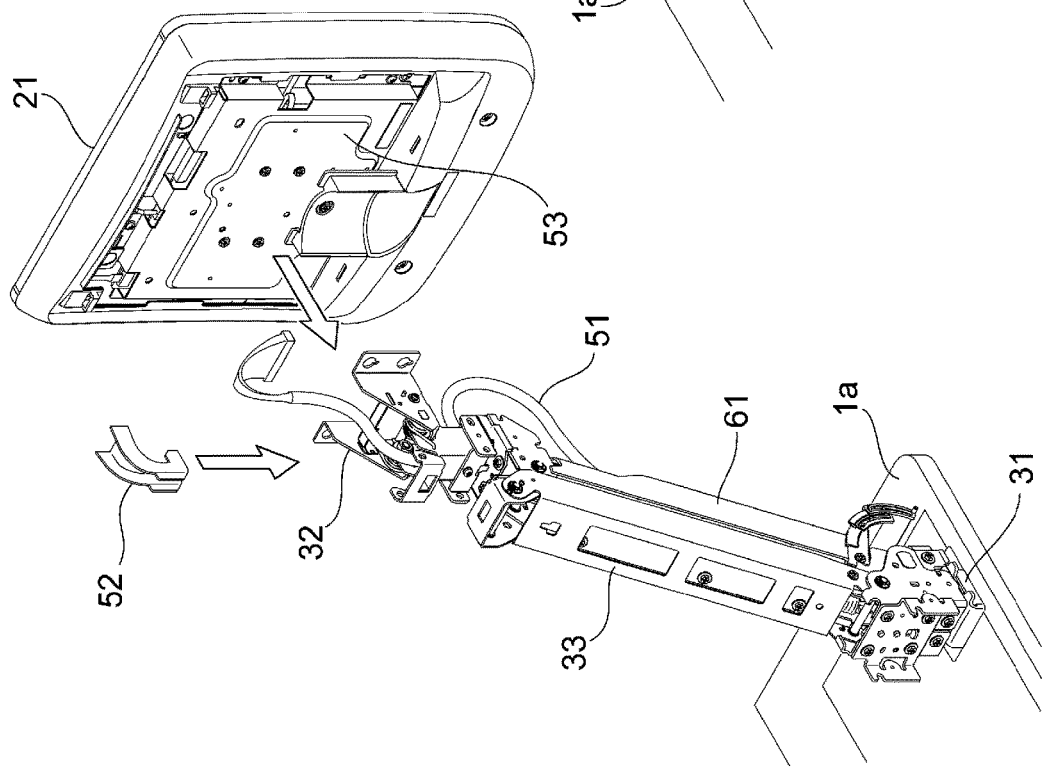

Thereafter, as shown in FIG. 8B, the cover 62 covering the upper side of the connecting unit 33 is screwed and attached to the connecting unit 33.

Figure 9A:
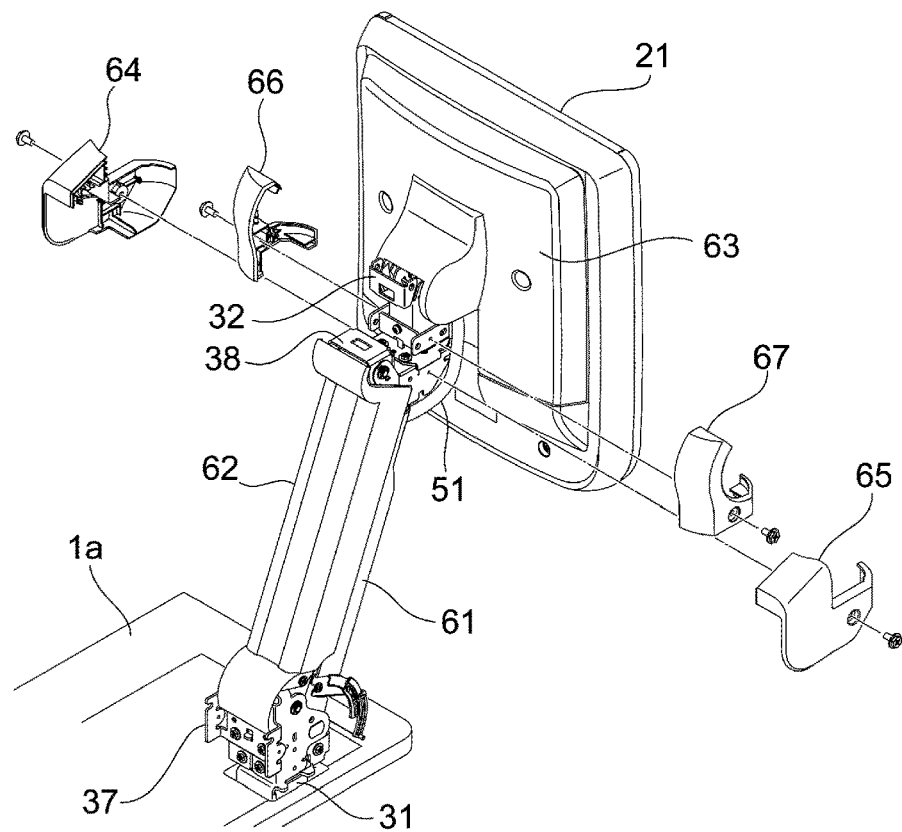
FIGS. 9A and 9B illustrate the fabrication of the movable holding device in time series.

Thereafter, as shown in FIG. 9A, a cover 63 covering the rear surface of the operation unit 21 is attached to the operation unit 21. Covers 64 and 65 are attached to cover the upper end member 38 from sides, and covers 66 and 67 are attached to cover the holding unit 32 from sides.

Figure 9B:
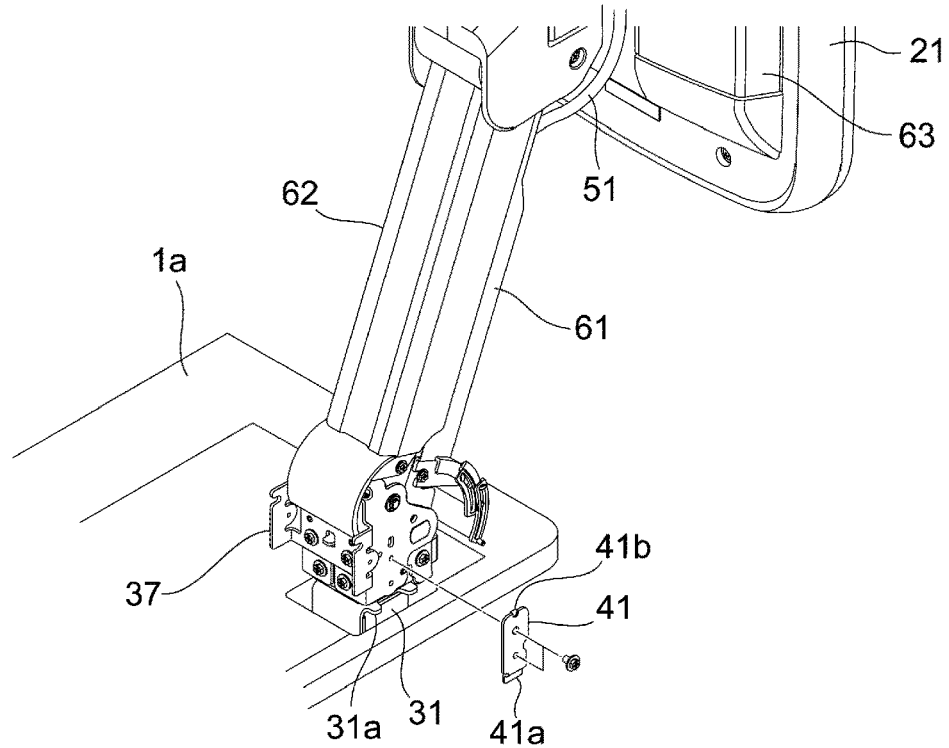

As shown in FIG. 9B, the rotation side regulating unit 41 is screwed to the lower end member 37. The rotation side regulating unit 41 includes a hooking portion 41b for hooking the rotation side regulating unit 41. Since the rotation side regulating unit 41 is attached on the side surface of the lower end member 37, providing the hooking portion 41b eliminates the need to hold the rotation side regulating unit 41 by hand to prevent the rotation side regulating unit 41 from dropping before screwing, thereby improving workability.

Figure 10A:
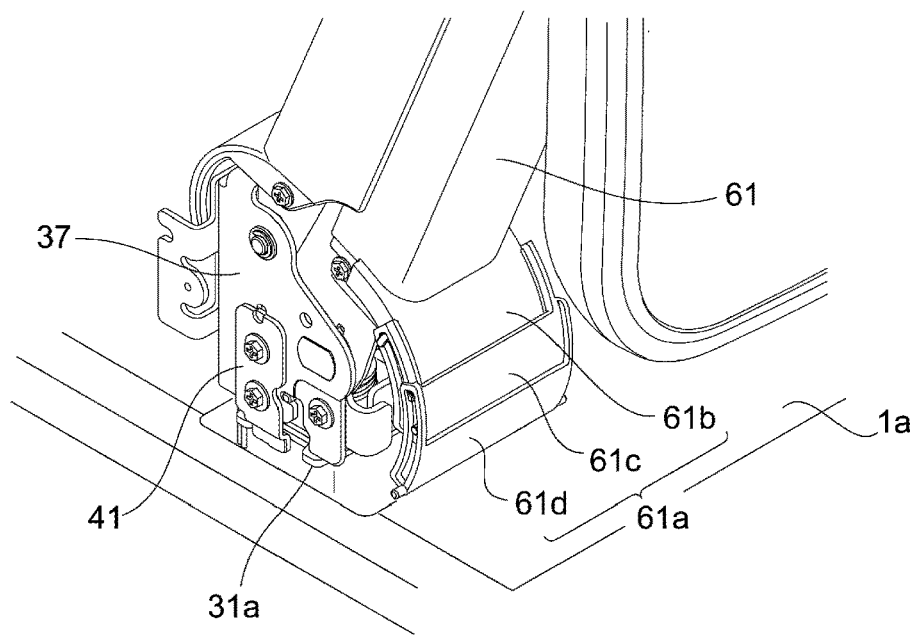
FIGS. 10A and 10B illustrate the fabrication of the movable holding device in time series.

Here, as shown in FIG. 10A, a shutter portion 61a is provided at the lower end of the cover 61. The shutter portion 61a has three shutter pieces 61b, 61c, and 61d. The longitudinal cross-sectional shape of each of the shutter pieces 61b, 61c, and 61d is an arc.

The shutter piece 61b is located uppermost, the shutter piece 61d is located lowermost, and the shutter piece 61c is located between the shutter piece 61b and the shutter piece 61d.

The shutter piece 61b is fixed, the shutter piece 61c is movable with respect to the shutter piece 61b, and the shutter piece 61d is movable with respect to the shutter piece 61c. The movable structure of the present exemplary embodiment is configured as follows. The shutter piece 61b is formed with a projection on the arc-shaped side surface, the shutter piece 61c is formed with a groove portion for receiving the projection of the shutter piece 61b and the projection is formed on the arc-shaped side surface. The shutter piece 61d is formed with a groove portion for receiving the projection of the shutter piece 61c.

The shutter pieces 61c and 61d move in the closing direction of the shutter portion 61a by their own weight. When the shutter pieces 61c and 61d are lifted by an external force, the shutter piece 61d overlaps the shutter piece 61c, and the shutter piece 61c overlaps the shutter piece 61b (see FIG. 8B).

The region between the connecting unit 33 and the mounting plate 1a is covered by the shutter portion 61a of the cover 61. Then, in a case where the connecting unit 33 rotates in the height direction and the region between the connecting unit 33 and the mounting plate 1a changes in the height direction, the overlapping state of the shutter pieces 61c and 61d hanging down on the shutter piece 61b by own weight thereof also changes to cover the region.

In other words, the connecting unit 33 is rotatable so that the level of the connecting unit 33 from the mounting surface BP of the mounting plate 1a changes, and the shutter portion 61a of the cover 61 maintains the state of covering the space between the connecting unit 33 and the mounting surface BP regardless of the rotation. The shutter portion 61a is configured such that the overlapping state of the shutter pieces 61b, 61c, and 61d overlapping with each other changes in accordance with the level of the connecting unit 33 from the mounting surface BP (for example, see FIGS. 2A and 2B). As a result, the region between the connecting unit 33 and the mounting plate 1a is hidden. Since the cover 61 having the shutter portion 61a is screwed and attached to the connecting unit 33, it can be said that the connecting unit 33 has the shutter portion 61a.

The shutter portion 61a is an example of a covering member, and the shutter pieces 61b, 61c, and 61d are examples of member pieces overlapping with each other. The mounting surface BP of the mounting plate 1a is an example of a mounting surface.

Figure 10B:
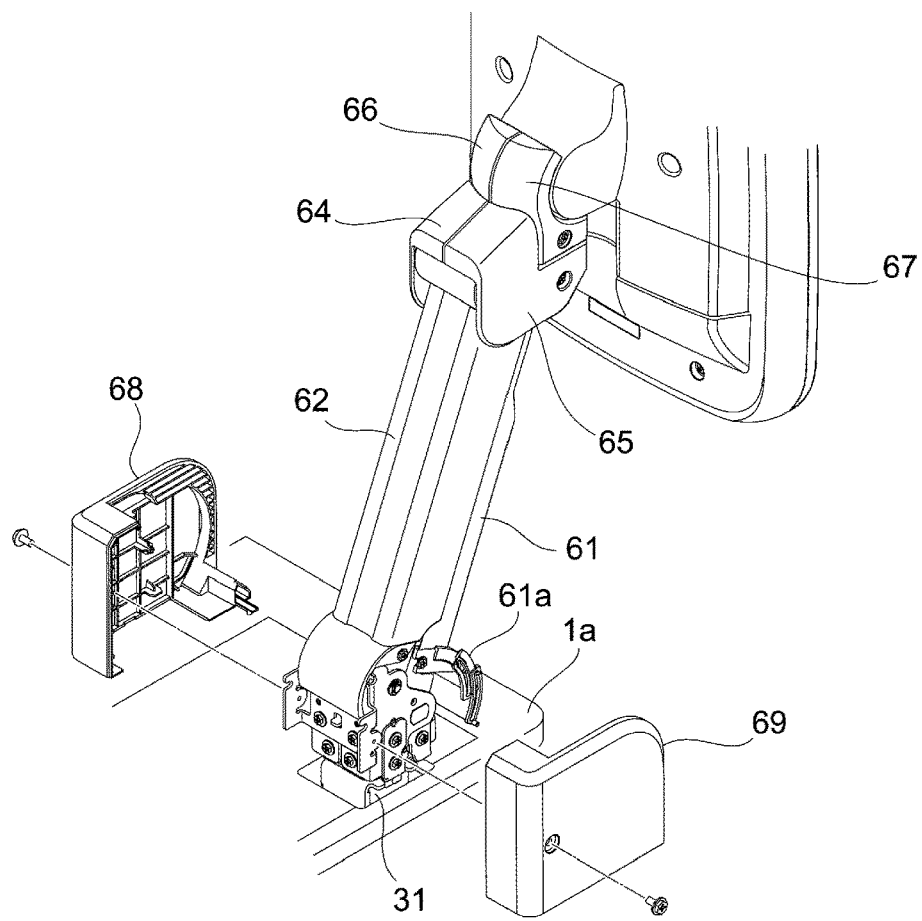

The fabrication of the movable holding device 30 will be described with reference to FIG. 10B. When the covers 68 and 69 that cover the fixing portion 31 from side are attached, the fixing portion 31 is covered by the covers 68 and 69.

In this state, although it is impossible to access the rotation side regulating unit 41 (for example, see FIG. 9B), by removing the cover 69, access to and replacement of the rotation side regulating unit 41 can be performed.

Comparison of Rigidity of Movable Holding Device 30

Next, the rigidity of the movable holding device 30 according to the present exemplary embodiment will be described in comparison with other structures.

Figure 11A:
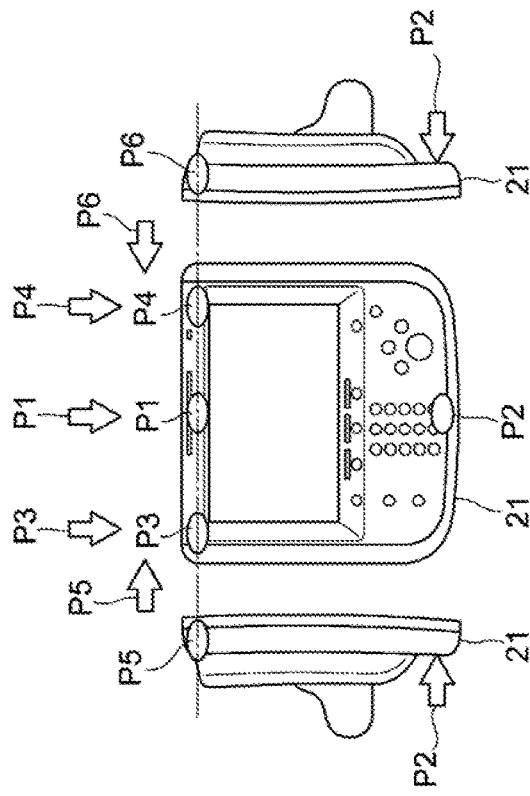
FIGS. 11A and 11B illustrate a comparison of rigidities when a load is input to the operation unit.
Figure 11B:
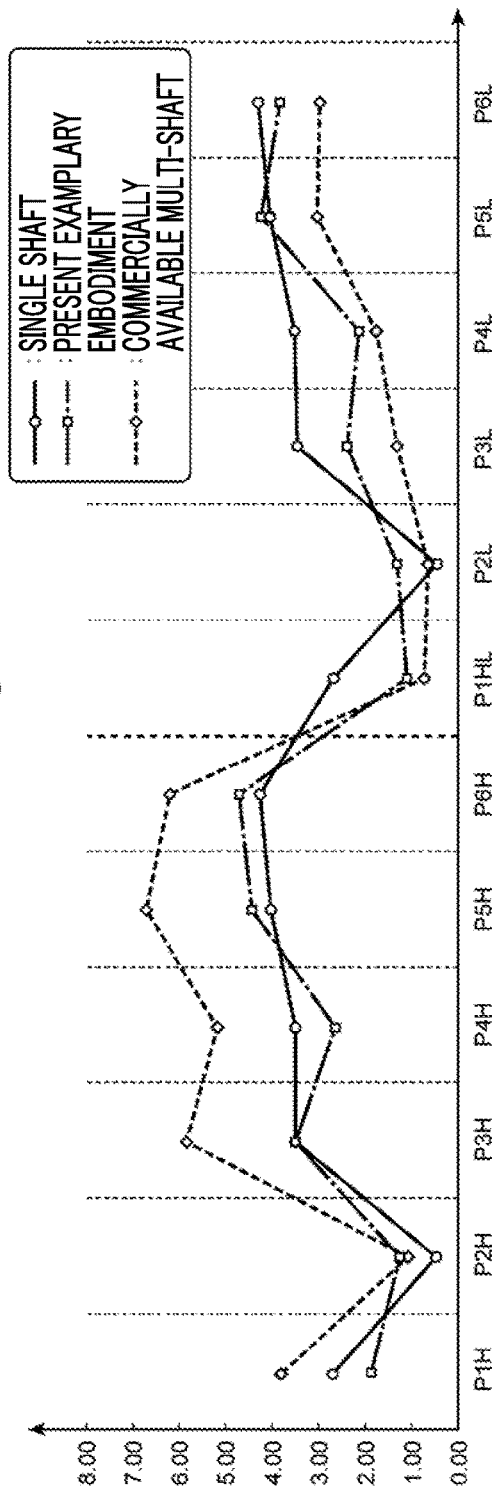

FIGS. 11A and 11B are diagrams illustrating a comparison of rigidity when a load is input to the operation unit 21. FIG. 11A is a front view and both side views illustrating a region and a direction of load input to the operation unit 21, in which a region is shown in an elliptical shape and a direction is shown by an arrow. FIG. 11B is a graph showing the measurement results of the rigidities of the movable holding device 30 according to the present exemplary embodiment and the single shaft and the multi-shafts (commercially available multi-shafts) which are commercially available, and the vertical axis represents the rigidity. The left side in FIG. 11B shows a case where the operation unit 21 is at the high position, and the right side thereof shows a case where the operation unit 21 is at the low position.

The rigidity was measured at six points in regions P1, P2, P3, P4, P5, and P6 shown in FIG. 11A. In the case of the regions P1 and P2, a tilt operation (vertical angle adjustment) of the operation unit 21 is performed, in the case of the regions P3 and P4, a swivel operation (lateral angle adjustment) of the connecting unit 33 is performed, and in the case of the regions P5 and P6, a lateral push operation is performed.

As shown in FIG. 11B, when the operation unit 21 is attached to a commercially available multi-shafts, the rigidity is high when the position of the operation unit 21 is high, and when the position of the operation unit 21 is low, the rigidity is lower than when the position of the operation unit 21 is high. In the commercially available multi-shafts, the rigidity differs between the high position and the low position, and in the case of operating the input unit 23 of the operation unit 21 (see FIG. 1), the operation unit 21 swings according to the position, which is not preferable from the viewpoint of usability.

When the operation unit 21 is attached on a single shaft, the difference in rigidity between the high position and the low position of the operation unit 21 is smaller than when the operation unit 21 is attached on the commercially available multi-shafts.

In the case of the movable holding device 30 according to the present exemplary embodiment, the rigidities at the high position and the low position of the operation unit 21 is the same as in the case of the single shaft. In other words, in the present exemplary embodiment, the rigidity is higher than that in a case of the commercially available multi-shafts.

In the case of the single shaft, the difference in rigidity between a high position and a low position is smaller, which is preferable from the viewpoint of usability than the commercially available multi-shafts, but the range in which the operation unit 21 is movable with respect to the image forming apparatus 1 is narrower than that in the case of the commercially available multi-shafts, which is not preferable from the viewpoint of convenience of use.

On the other hand, in the present exemplary embodiment, the difference in rigidity due to the difference in position is smaller than that in the case of the commercially available multi-shafts, which is preferable from the viewpoint of the usability. Further, the range of movement of the operation unit 21 is wider than that in the case of the single shaft, which is preferable from the viewpoint of convenience of use.

Position of Operation Device 2 with Respect to Image Forming Apparatus 1

As described above, in the image forming system 100, the image forming apparatus 1 includes the document feeding device 17 that can be opened and closed by rotation. The operation device 2 includes the operation unit 21 and the movable holding device 30, and is rotated and displaced with respect to the image forming apparatus 1. The movable range of the movable holding device 30 is set within a range in which the displacement of the operation unit 21 is allowed with respect to the movable range of the document feeding device 17.

Hereinafter, the position of the operation device 2 with respect to the image forming apparatus 1 will be described.

Figure 12A:
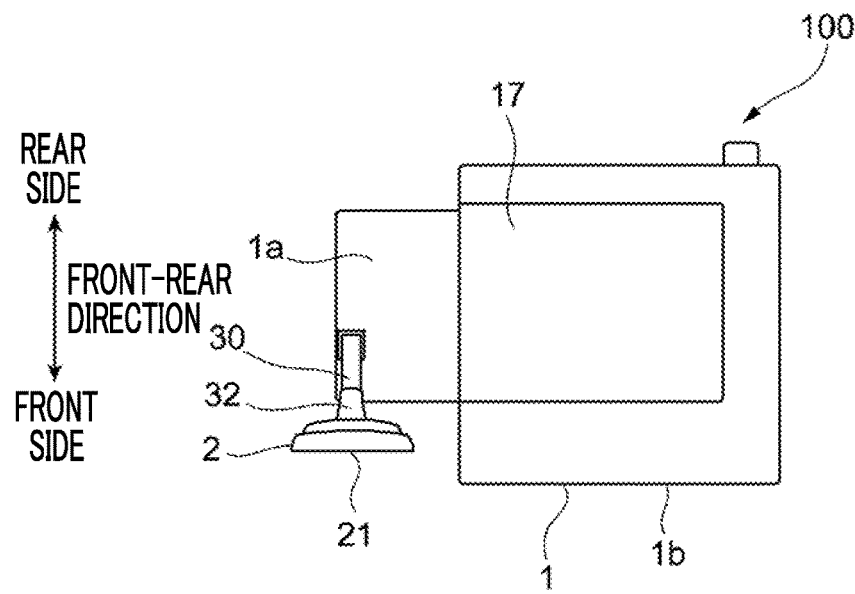
FIGS. 12A, 12B, and 12C illustrate a position of the operation device with respect to the image forming apparatus.
Figure 12B:
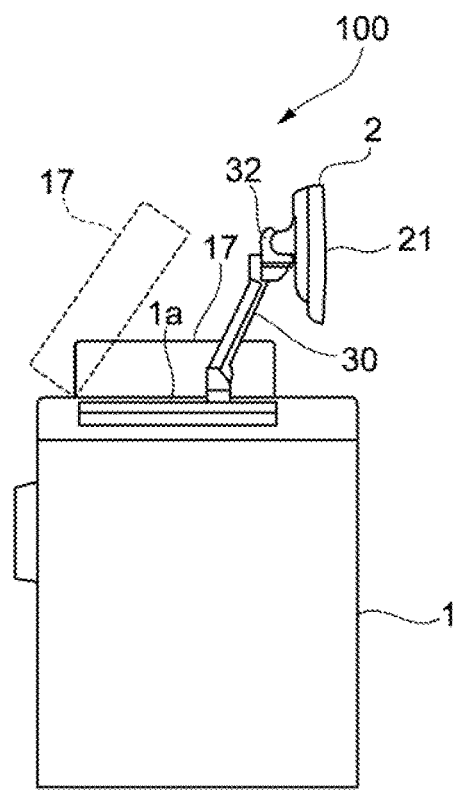
Figure 12C:
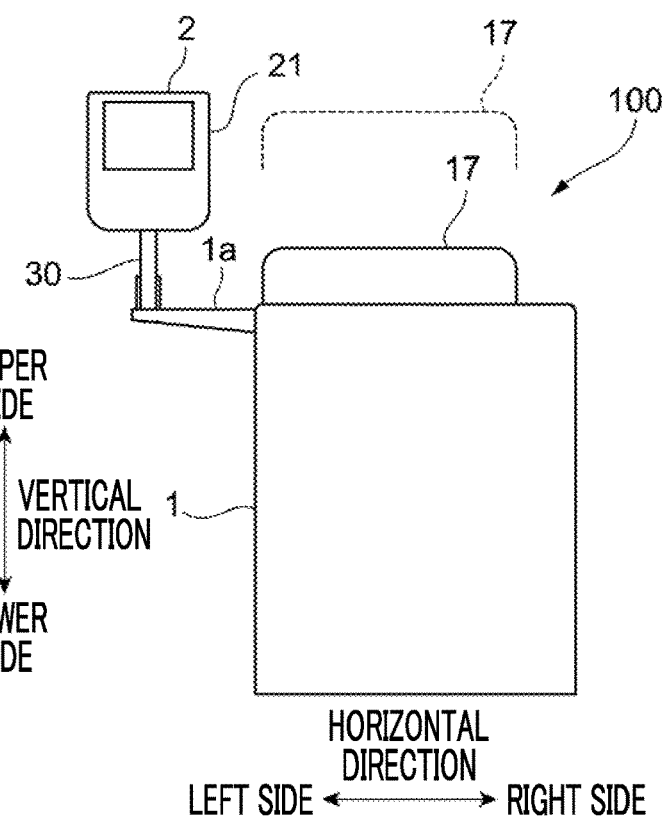

FIGS. 12A to 13D are diagrams illustrating positions of the operation device 2 with respect to the image forming apparatus 1, and FIGS. 12A and 13A are plan views of the image forming system 100, FIG. 12B is a left side view, FIGS. 12C and 13C are front views, and FIG. 13D is a right side view. Note that, all of these drawings illustrate the case where the operation unit 21 of the operation device 2 is raised to the uppermost position. The broken line indicates a state in which the document feeding device 17 is raised.

In the operation device 2 shown in FIGS. 12A to 12C, the movable holding device 30 extends toward the front in a state where the operation unit 21 located at the uppermost position faces the front. As shown in FIG. 12A or 12B, the operation unit 21 is located in front of a front end of the mounting plate 1a, but is located behind a front surface 1b of the image forming apparatus 1.

As shown in FIGS. 12A to 12C, the operation unit 21 is located above the document feeding device 17. The operation unit 21 is located closer to the holding unit 32 than to the document feeding device 17 in the horizontal direction of the image forming apparatus 1. Therefore, it is possible to prevent the operation unit 21 from interfering with the document feeding device 17 when the document feeding device 17 is opened and closed.

In the operation device 2 shown in FIGS. 13A to 13D, the operation unit 21 is directed toward the document feeding device 17. That is, the movable holding device 30 is rotated by A degrees as compared with the case of FIGS. 12A to 12C, so that the operation unit 21 is directed toward the document feeding device 17. Further, the holding unit 32 of the movable holding device 30 is rotated by B degrees as compared with the case of FIGS. 12A to 12C. Thus, the operation device 2 shown in FIGS. 13A to 13D is directed toward the document feeding device 17 at an angle obtained by adding B degrees (swing angle) to A degrees (arm rotation angle). For example, 15 degrees are set as A degrees, and 45 degrees are set as B degrees. The rotation by the A degree is an example of the rotation at the mounting position of the upper surface portion, and the rotation by the B degrees is an example of the rotation of the operation unit at a position other than the mounting position. The front surface 1b of the image forming apparatus 1 is an example of the front surface of the apparatus.

Also in this case, as in FIGS. 12A to 12C, the operation unit 21 is located closer to the holding unit 32 than to the document feeding device 17 in the horizontal direction of the image forming apparatus 1, and is set so as not to enter the movable range of the document feeding device 17.

Figure 15A:
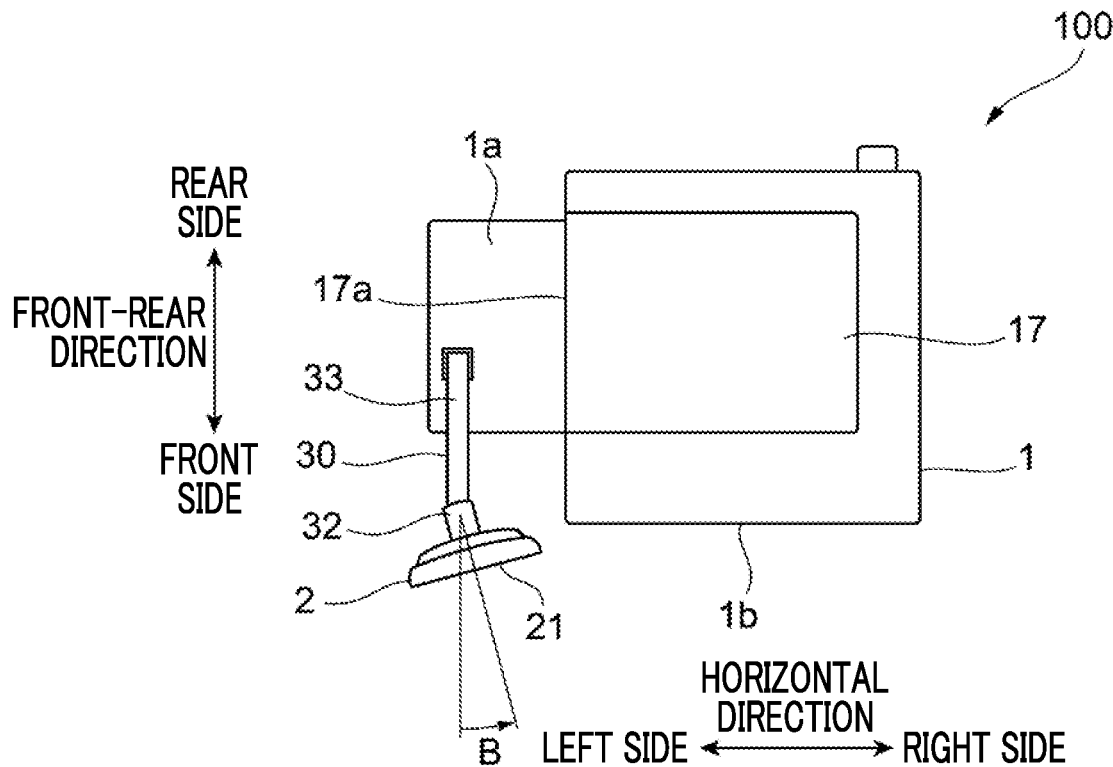
FIGS. 15A and 15B are plan views of the image forming system, and illustrate a position of the operation device with respect to the image forming apparatus.
Figure 15B:
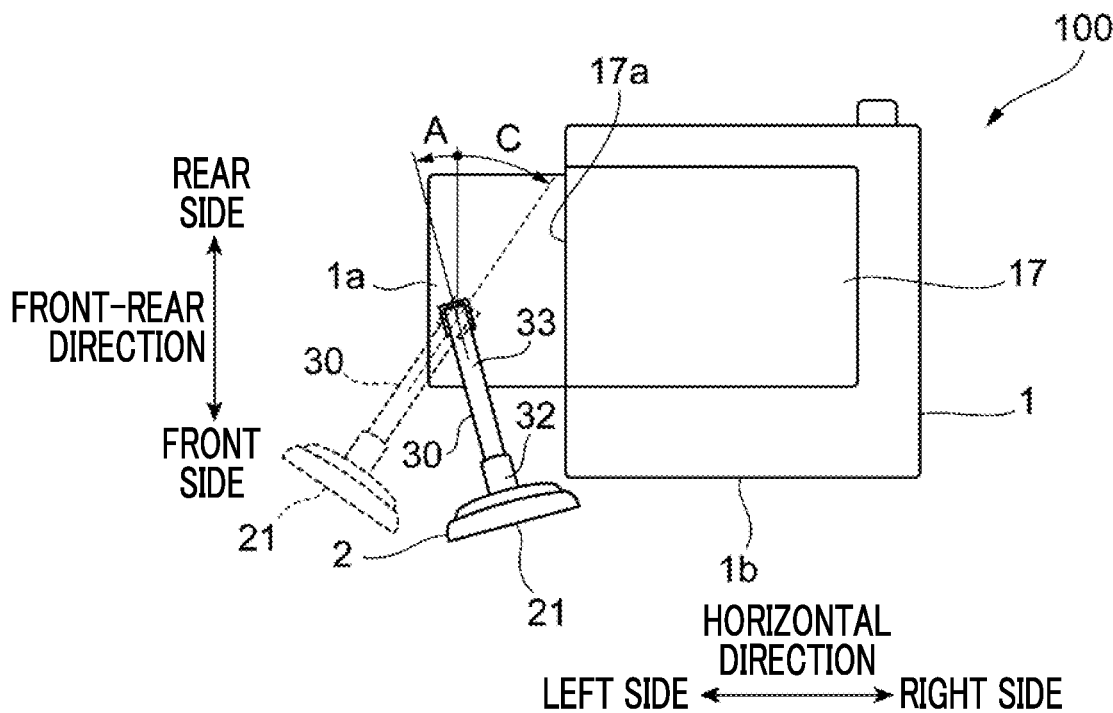

FIGS. 14A to 15B illustrate a position of the operation device 2 with respect to the image forming apparatus 1, FIG. 14A is a plan view of the image forming system 100, FIG. 14B is a left side view, and FIG. 14C is a front view. FIGS. 15A and 15B are plan views of the image forming system 100. Note that, all of these drawings illustrate the case where the operation unit 21 is at the lowest level, and the state in which the document feeding device 17 is raised is indicated by a broken line.

In the operation device 2 shown in FIGS. 14A to 14C, the movable holding device 30 located at the lowermost position extends toward the front, and the operation unit 21 faces the front.

In the operation device 2 shown in FIG. 15A, the holding unit 32 rotates in the direction of the document feeding device 17 with respect to the connecting unit 33, and thereby, the operation unit 21 is directed toward the document feeding device 17. In the operation device 2 shown in FIG. 15B, the holding unit 32 is not rotated in the direction of the document feeding device 17 with respect to the connecting unit 33, but the operation unit 21 is directed toward the document feeding device 17.

Here, for example, when a user uses a wheelchair, as shown in FIG. 14C, the level that the user can reach becomes low, and the line of sight becomes low. Therefore, in order to secure operability in a state where a user sits on a wheelchair, it is preferable that the operation unit 21 can be moved to a front side at a lower position.

In view of the above, the operation device 2 according to the present exemplary embodiment is configured. Hereinafter, a detailed description will be given.

As shown in FIG. 15B, the operation unit 21 is displaceable closer to the center of the document feeding device 17 than to an end portion 17a of the document feeding device 17 located on the holding unit 32 side in the horizontal direction of the image forming apparatus 1.

As shown in FIGS. 14A to 14C or FIGS. 15A and 15B, the operation unit 21 is located below the document feeding device 17. For example, referring to FIG. 14B, the lower end portion BL of the operation unit 21 is below the mounting surface BP of the mounting plate 1a. The lower end portion BL of the operation unit 21 can be displaced to below a reading surface 1c on which the image of a document (see FIG. 16) is to be read.

Further, as shown in FIGS. 14A to 14C or 15A and 15B, the operation unit 21 is located (on a front side) in front of the front surface 1b of the image forming apparatus 1. That is, the movable holding device 30 is configured such that, when the movable holding device 30 is in the front side of the image forming apparatus 1, the operation unit 21 protrudes from the image forming apparatus 1.

In the present exemplary embodiment described above, the operation unit 21 can be moved toward the document feeding device 17 and can be displaced to below the document feeding device 17, and can be moved forward with respect to the front surface 1b. Accordingly, even when a user sits on a wheelchair, it is possible to displace the operation unit 21 to a position at which a decrease in operability can be prevented.

Herein, the "position at which a decrease in operability can be prevented" refers to a position of the operation unit 21 at which a user can perform a necessary operation on the input unit 23 of the operation unit 21, and refers to the level and/or the position at the front-rear direction with respect to the front surface 1b of the image forming apparatus 1. The position at which a decrease in operability can be prevented is, for example, the position of the operation unit 21 shown in FIGS. 14A to 14C, and specifically, a position which is close to the document feeding device 17 and in which the lower end portion BL is located below the document feeding device 17 and located in front of the front surface 1b.

The end portion 17a of the document feeding device 17 is an example of the end portion of the movable unit on the side of the attachment unit. The reading surface 1c is an example of a surface on which an image is read by the device. The lower end portion BL of the operation unit 21 is an example of the lower end portion of the operation unit.

Referring to FIG. 15A, in the operation device 2, the connecting unit 33 of the movable holding device 30 extends toward the front, and the operation unit 21 rotates by B degrees to directed toward the document feeding device 17. The operation unit 21 is located closer to the holding unit 32 than to the document feeding device 17 in the horizontal direction of the image forming apparatus 1. That is, the operation unit 21 is located closer to the holding unit 32 than to the end portion 17a of the document feeding device 17, and the range of rotation is set so as not to enter the movable range of the document feeding device 17.

Referring to FIG. 15B, the connecting unit 33 of the movable holding device 30 is at a position where the movable holding device 30 rotates by A degrees in the direction toward the document feeding device 17 (see a solid line). In addition, the connecting unit 33 can rotate by C degrees in the opposite direction away from the document feeding device 17 (see a broken line). A degrees are less than C degrees (A degrees<C degrees).

In the present exemplary embodiment described above, the range of rotation of the movable holding device 30 is set such that the range of rotation when the operation unit 21 is displaced in the direction toward the document feeding device 17 is smaller than when the operation unit 21 is displaced in the direction away from the document feeding device 17.

The operation unit 21 shown in FIG. 15B is at the lowest position as described above, and the lower end portion BL of the operation unit 21 is located below the mounting surface BP of the mounting plate 1a. In such a case, the operation unit 21 shown by the solid line can be displaced closer to the center of the document feeding device 17 than to the end portion 17a of the document feeding device 17 in the horizontal direction of the image forming apparatus 1.

Figure 16:
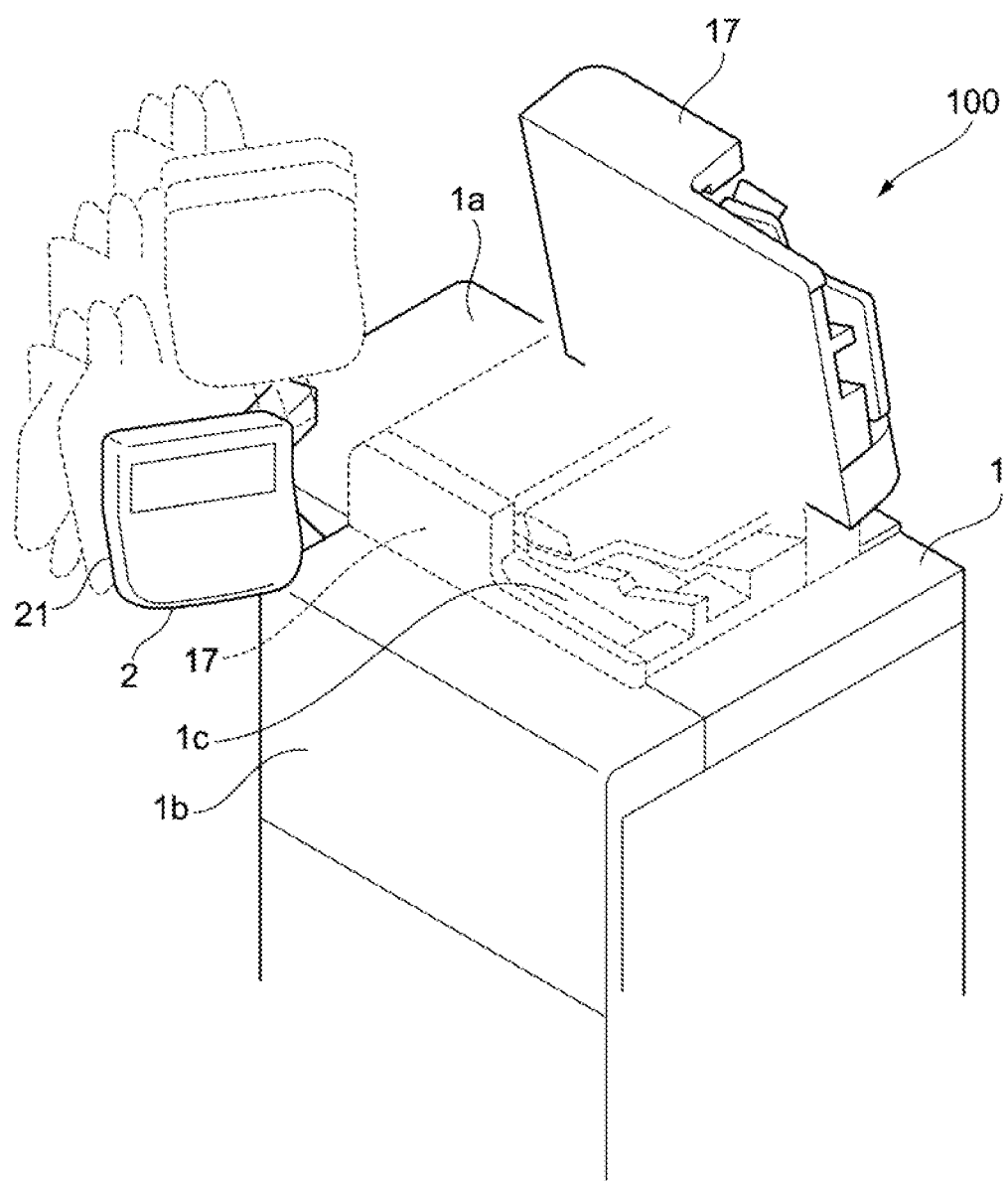
FIG. 16 is a perspective view showing a relationship between the movable range of the operation unit of the operation device and the movable range of a document feeding device of the image forming apparatus.

FIG. 16 is a perspective view showing the relationship between the movable range of the operation unit 21 of the operation device 2 and the movable range of the document feeding device 17 of the image forming apparatus 1.

In the operation unit 21 shown in FIG. 16, a position directed toward the document feeding device 17 at the lowest position is indicated by a solid line, and other positions are indicated by a broken line. The opened state of document feeding device 17 is indicated by a solid line, and closed state thereof is indicated by a broken line. Thus, the rotation of the connecting unit 33 is limited so that the movable range of the operation unit 21 does not overlap the movable range of the document feeding device 17.

The operation unit 21 can be displaced to the front side with respect to the front surface 1b of the image forming apparatus 1, and can be displaced closer to the center of the document feeding device 17 than to the end portion 17a of the document feeding device 17. As a result, the user can perform a necessary operation on the operation unit 21 while maintaining the seating posture, thereby ensuring ease of use.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A movable holding device comprising:
   a base;
   an attachment unit to which an operation unit is to be attached; and
   a connecting unit that extends in a longitudinal direction, has recessed members forming a space with each other and being connected to each other so that a relative movement thereof changes a position of the attachment unit with respect to the base, and has one longitudinal end portion connected to the base and another longitudinal end portion connected to the attachment unit.

2. The movable holding device according to claim 1, wherein
   the connecting unit accommodates, in the space, a biasing member configured to maintain the position of the attachment unit with respect to the base.

3. The movable holding device according to claim 2, wherein
   the biasing member is a spring member that applies a biasing force to the recessed members of the connecting unit.

4. The movable holding device according to claim 2, wherein
   the biasing member is accommodated in the space in a state where one of the recessed members is released from the base and/or the attachment unit and another of the recessed members is connected to the base and/or the attachment unit.

5. The movable holding device according to claim 1, wherein
   the recessed members of the connecting unit are rotatable to change a level thereof from a mounting surface on which the base is mounted, and the connecting unit includes a covering member that maintains a covering state between the recessed members and the mounting surface regardless of the rotation.

6. The movable holding device according to claim 5, wherein
the covering member is configured such that an overlapping state of the recessed members overlapping each other changes according to the level.

7. The movable holding device according to claim 1, wherein
the connecting unit is rotatable at a mounting position where the connecting unit is mounted on the base, and rotates in a range in which a first member rotatable together with the recessed members engages with a second member not rotatable together with the recessed members, and
the first member or the second member is detachable in a state where the base is mounted at the mounting position.

8. The movable holding device according to claim 7, wherein
any one of the first member or the second member has two projections spaced apart from each other, and the other one has a portion located between the two projections.

9. The movable holding device according to claim 1, wherein
the connecting unit is rotatable at a mounting position where the connecting unit is mounted on the base, and rotates in a range in which a first member rotatable together with the recessed members engages with a second member not rotatable together with the recessed members, and
the first member or the second member is detachable in a state where the connecting unit is connected to the base.

10. An image forming system comprising:
an image forming unit that forms an image on a sheet;
a sheet feeding unit that replenishes sheets from a side in front of the image forming unit and feed the replenished sheets;
a base that is mounted on an apparatus including the image forming unit;
an attachment unit to which an operation unit for operating the image forming unit is to be attached; and
a connecting unit that extends in a longitudinal direction, has recessed members forming a space with each other and being connected to each other so that relative movement thereof changes a position of the attachment unit with respect to the base, and has one longitudinal end portion connected to the base and another longitudinal end portion connected to the attachment unit.

11. An operation unit displacement device comprising:
an operation unit;
a displacement unit that has an attachment unit to which the operation unit is attached and a joint that displaces the operation unit by rotation, and is mounted on an apparatus operated in response to an operation on the operation unit; and
a regulation unit that regulates, based on a first movable range, a second movable range, wherein the first movable range is a range in which a movable unit is movable on the apparatus, and the second movable range is a range in which the displacement unit is movable in a range where displacement of the operation unit by the displacing unit is allowed.

12. The operation unit displacement device according to claim 11, wherein
the movable unit moves in a vertical direction, and
when the operation unit is located above the movable unit of the apparatus, the operation unit in the second movable range regulated by the regulation unit is closer to the attachment unit than to the movable unit in the horizontal direction of the apparatus.

13. The operation unit displacement device according to claim 12, wherein
the movable unit moves in the vertical direction, and
when the operation unit is located below the movable unit of the apparatus, the operation unit in the second movable range regulated by the regulation unit is displaceable closer to the center in the horizontal direction of the movable unit than to an end portion of the movable unit on the attachment unit side in the horizontal direction of the apparatus.

14. The operation unit displacement device according to claim 11, wherein
the regulation unit regulates and changes the displacement of the operation unit by the displacement unit in accordance with the second movable range.

15. The operation unit displacement device according to claim 11, wherein
the movable unit is an opening and closing member that is configured to open and close with respect to a surface on which an image is read by the apparatus.

16. The operation unit displacement device according to claim 11, wherein
the displacement unit displaces the operation unit by rotation to a position where the operability of the operation unit by a user who is in a seated posture is prevented from decreasing.

17. The operation unit displacement device according to claim 16, wherein
the displacement unit is configured such that, when the operation unit is located closer to a front side of the apparatus than to a mounting position at which the displacement unit is mounted on the apparatus, a lower end portion of the operation unit is displaceable to below the surface on which an image is to be read by the apparatus.

18. The operation unit displacement device according to claim 16, wherein
the displacement unit is configured such that when the operation unit is on the front side of the apparatus, the operation unit protrudes from the apparatus.

19. The operation unit displacement device according to claim 11, wherein
the regulation unit regulates a range in which the operation unit is displaceable by engaging a first member that rotates together with the displacement unit and a second member that does not rotate together with the displacement unit, and
the first member or the second member is detachable in a state where a base constituting a part of the displacement unit is mounted on the apparatus.

20. The operation unit displacement device according to claim 19, wherein
the displacement unit is mounted on an upper surface portion of the apparatus, is rotatable at a mounting position of the upper surface portion and rotatable to be displaced in a height direction, and rotates the operation unit at a position other than the mounting position, and
the regulating unit regulates the displacement of the operation unit so that the operation unit does not enter the movable range of the movable unit even when the operation unit is directed toward the movable unit by rotation at a position other than the mounting position.

* * * * *